(12) United States Patent
Taylor et al.

(10) Patent No.: US 7,753,259 B1
(45) Date of Patent: *Jul. 13, 2010

(54) SYSTEM AND METHOD FOR GRANTING PROMOTIONAL REWARDS TO BOTH CUSTOMERS AND NON-CUSTOMERS

(75) Inventors: Robert Cameron Taylor, Dublin, OH (US); Jeffrey J. Pilarcik, Columbus, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 11/504,557

(22) Filed: Aug. 14, 2006

Related U.S. Application Data

(63) Continuation-in-part of application No. 11/403,317, filed on Apr. 13, 2006.

(51) Int. Cl.
G06Q 40/00 (2006.01)
G07D 11/00 (2006.01)
G07F 19/00 (2006.01)

(52) U.S. Cl. ............... 235/379; 235/375; 235/380; 235/381; 235/383; 705/14; 705/43

(58) Field of Classification Search ............ 235/379, 235/381, 383, 375; 705/14, 43
See application file for complete search history.

(56) References Cited

U.S. PATENT DOCUMENTS

| | | | |
|---|---|---|---|
| 2,005,003 | A | 6/1935 | Patton et al. |
| 3,634,669 | A | 1/1972 | Soumas |
| 3,713,235 | A | 1/1973 | Roberts |
| 3,938,090 | A | 2/1976 | Borison et al. |
| 3,946,206 | A | 3/1976 | Darjany |
| 4,047,033 | A | 9/1977 | Malmberg et al. |
| 4,058,220 | A | 11/1977 | Torongo |
| D248,203 | S | 6/1978 | Morse |
| 4,130,881 | A | 12/1978 | Haessler et al. |

(Continued)

FOREIGN PATENT DOCUMENTS

CA 2293321 12/1998

(Continued)

OTHER PUBLICATIONS http://www.chevychasebank.com, $1,000 ATM Cash Sweepstakes, Official Rules, 4 pages.

(Continued)

*Primary Examiner*—Michael G Lee
*Assistant Examiner*—Ali Sharifzada
(74) *Attorney, Agent, or Firm*—Hunton & Williams LLP

(57) ABSTRACT

Methods of operating a promotional program for customers of a Banking institution are disclosed, comprising the dispensing of a receipt with a symbol or picture thereon redeemable for a prize, wherein the dispensing of the receipt is accomplished through the use of an automated teller machine (ATM); and wherein the ATM machine dispenses the receipt after successful completion of a transaction. The symbol or picture may be printed or stamped or otherwise affixed on the receipt dispensed from the ATM, either before or during the transaction. ATM receipts with the symbol or picture may be irregularly or randomly dispensed. Such promotional programs may be used to give away varied prizes, including but not limited to tickets for sporting events.

18 Claims, 3 Drawing Sheets

U.S. PATENT DOCUMENTS

| | | |
|---|---|---|
| 4,205,780 A | 6/1980 | Burns |
| 4,264,808 A | 4/1981 | Owens et al. |
| 4,321,672 A | 3/1982 | Braun et al. |
| 4,338,587 A | 7/1982 | Chiappetti |
| 4,453,074 A | 6/1984 | Weinstein |
| 4,454,414 A | 6/1984 | Benton |
| 4,465,206 A | 8/1984 | Sorel et al. |
| 4,545,838 A | 10/1985 | Minkus et al. |
| 4,575,621 A | 3/1986 | Dreifus |
| 4,582,985 A | 4/1986 | Lofberg |
| 4,605,844 A | 8/1986 | Haggan |
| 4,614,861 A | 9/1986 | Pavlov et al. |
| 4,634,845 A | 1/1987 | Riley et al. |
| 4,643,452 A | 2/1987 | Chang et al. |
| 4,650,981 A | 3/1987 | Foletta |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,723,212 A | 2/1988 | O'Brien et al. |
| 4,746,787 A | 5/1988 | Okada et al. |
| 4,750,119 A | 6/1988 | Robertson et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,817,949 A | 4/1989 | Bachman et al. |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,845,347 A | 7/1989 | McCrindle |
| 4,859,837 A | 8/1989 | Halpern |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| D305,887 S | 2/1990 | Nishimura |
| 4,906,826 A | 3/1990 | Spencer |
| 4,908,521 A | 3/1990 | Boggan et al. |
| 4,910,672 A | 3/1990 | Off |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,948,174 A | 8/1990 | Thomson et al. |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,977,501 A | 12/1990 | Lefevre |
| 4,978,401 A | 12/1990 | Bonomi |
| 4,992,940 A | 2/1991 | Dworkin |
| 5,025,139 A | 6/1991 | Halliburton, Jr. |
| 5,025,372 A | 6/1991 | Burton et al. |
| 5,049,728 A | 9/1991 | Rovin |
| 5,054,096 A | 10/1991 | Beizer |
| 5,055,662 A | 10/1991 | Hasegawa |
| 5,072,380 A | 12/1991 | Randelman et al. |
| 5,080,748 A | 1/1992 | Bonomi |
| 5,095,194 A | 3/1992 | Barbanell |
| 5,097,115 A | 3/1992 | Ogasawara et al. |
| 5,117,355 A | 5/1992 | McCarthy |
| 5,121,945 A | 6/1992 | Thomson et al. |
| 5,146,068 A | 9/1992 | Ugawa et al. |
| 5,175,416 A | 12/1992 | Mansvelt |
| 5,177,342 A | 1/1993 | Adams |
| 5,180,901 A | 1/1993 | Hiramatsu |
| 5,185,697 A | 2/1993 | Jacobs et al. |
| 5,187,750 A | 2/1993 | Behera |
| 5,191,522 A | 3/1993 | Bosco et al. |
| 5,192,947 A | 3/1993 | Neustein |
| 5,201,010 A | 4/1993 | Gabriel |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,237,620 A | 8/1993 | Deaton |
| 5,247,190 A | 9/1993 | Friend et al. |
| 5,257,486 A | 11/1993 | Holmwall |
| 5,276,311 A | 1/1994 | Hennige |
| 5,276,802 A * | 1/1994 | Yamaguchi et al. ......... 385/115 |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,343,529 A | 8/1994 | Goldfine et al. |
| 5,349,633 A | 9/1994 | Katz |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,361,062 A | 11/1994 | Weiss et al. |
| 5,365,575 A | 11/1994 | Katz |
| 5,382,784 A | 1/1995 | Eberhardt |
| 5,383,113 A | 1/1995 | Knight |
| 5,388,165 A | 2/1995 | Gabriel et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,412,190 A | 5/1995 | Kopesec et al. |
| 5,412,192 A | 5/1995 | Hoss |
| 5,413,341 A | 5/1995 | Lieberman |
| 5,424,524 A | 6/1995 | Ruppert et al. |
| 5,444,794 A | 8/1995 | Uhland |
| 5,448,471 A | 9/1995 | Deaton et al. |
| 5,450,477 A | 9/1995 | Amarant et al. |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,481,094 A | 1/1996 | Suda |
| 5,482,139 A | 1/1996 | Rivalto |
| 5,483,444 A | 1/1996 | Malark et al. |
| 5,483,445 A | 1/1996 | Pickering |
| 5,489,123 A | 2/1996 | Roshkoff |
| 5,495,981 A | 3/1996 | Warther |
| 5,500,514 A | 3/1996 | Veeneman et al. |
| 5,500,890 A | 3/1996 | Rogge et al. |
| 5,503,891 A | 4/1996 | Marshall et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,532,689 A | 7/1996 | Bueno |
| 5,537,314 A | 7/1996 | Kanter |

| | | | | | |
|---|---|---|---|---|---|
| 5,541,583 A | 7/1996 | Mandelbaum | 5,765,138 A | 6/1998 | Aycock et al. |
| 5,544,086 A | 8/1996 | Davis et al. | 5,765,141 A | 6/1998 | Spector |
| 5,544,246 A | 8/1996 | Mandelbaum et al. | 5,770,843 A | 6/1998 | Rose et al. |
| 5,553,120 A | 9/1996 | Katz | 5,770,849 A | 6/1998 | Novis et al. |
| 5,577,109 A | 11/1996 | Stimson et al. | 5,774,870 A | 6/1998 | Storey |
| 5,578,808 A | 11/1996 | Taylor | 5,774,882 A | 6/1998 | Keen |
| 5,581,064 A | 12/1996 | Riley et al. | 5,777,305 A | 7/1998 | Smith et al. |
| 5,585,787 A | 12/1996 | Wallerstein | 5,777,306 A | 7/1998 | Masuda |
| 5,590,038 A | 12/1996 | Pitroda | 5,777,903 A | 7/1998 | Piosenka et al. |
| 5,592,560 A | 1/1997 | Deaton et al. | 5,778,067 A | 7/1998 | Jones et al. |
| 5,604,542 A | 2/1997 | Dedrick | 5,787,156 A | 7/1998 | Katz |
| 5,608,785 A | 3/1997 | Kasday | 5,787,404 A | 7/1998 | Fernandez-Holmann |
| 5,612,868 A | 3/1997 | Off | 5,789,732 A | 8/1998 | McMahon et al. |
| 5,617,474 A | 4/1997 | Ditzig et al. | 5,789,733 A | 8/1998 | Jachimowicz et al. |
| 5,619,558 A * | 4/1997 | Jheeta ..................... 379/92.01 | 5,790,636 A | 8/1998 | Marshall |
| 5,621,787 A | 4/1997 | McKoy et al. | 5,794,207 A | 8/1998 | Walker |
| 5,621,812 A | 4/1997 | Deaton et al. | 5,796,827 A | 8/1998 | Coppersmith et al. |
| 5,637,845 A | 6/1997 | Kolls | 5,798,950 A | 8/1998 | Fitzgerald |
| 5,638,457 A | 6/1997 | Deaton et al. | 5,799,087 A | 8/1998 | Rosen |
| 5,642,279 A | 6/1997 | Stone et al. | 5,802,176 A | 9/1998 | Audebert |
| 5,642,485 A | 6/1997 | Deaton et al. | 5,805,719 A | 9/1998 | Pare et al. |
| 5,644,723 A | 7/1997 | Deaton et al. | 5,806,042 A | 9/1998 | Kelly et al. |
| 5,644,727 A | 7/1997 | Atkins | 5,806,044 A | 9/1998 | Powell |
| 5,649,114 A | 7/1997 | Deaton et al. | 5,806,045 A | 9/1998 | Biorge |
| 5,649,117 A | 7/1997 | Landry | 5,807,627 A | 9/1998 | Friend et al. |
| 5,649,118 A | 7/1997 | Carlisle et al. | 5,809,478 A | 9/1998 | Greco |
| 5,650,604 A | 7/1997 | Marcous et al. | 5,814,796 A | 9/1998 | Benson et al. |
| 5,653,914 A | 8/1997 | Holmes et al. | 5,815,657 A | 9/1998 | Williams et al. |
| 5,659,469 A | 8/1997 | Deaton et al. | 5,815,658 A | 9/1998 | Kuriyama |
| 5,659,741 A | 8/1997 | Eberhardt | 5,819,234 A | 10/1998 | Slavin et al. |
| 5,664,110 A | 9/1997 | Green et al. | 5,819,237 A | 10/1998 | Garman |
| 5,664,157 A | 9/1997 | Takahira et al. | 5,826,243 A | 10/1998 | Musmanno et al. |
| 5,665,953 A | 9/1997 | Mazzamuto | 5,832,090 A | 11/1998 | Raspotnik |
| 5,672,678 A | 9/1997 | Holmes et al. | 5,832,457 A | 11/1998 | O'Brien |
| 5,675,607 A | 10/1997 | Alesio et al. | 5,832,488 A | 11/1998 | Eberhardt |
| 5,675,662 A | 10/1997 | Deaton et al. | 5,835,061 A | 11/1998 | Stewart |
| 5,677,521 A | 10/1997 | Garrou | 5,835,576 A | 11/1998 | Katz |
| 5,677,955 A | 10/1997 | Doggett et al. | 5,839,113 A | 11/1998 | Federau et al. |
| 5,680,459 A | 10/1997 | Hook et al. | 5,845,259 A | 12/1998 | West et al. |
| 5,684,291 A | 11/1997 | Taskett | 5,845,260 A | 12/1998 | Nakano et al. |
| 5,687,322 A | 11/1997 | Deaton et al. | 5,852,811 A | 12/1998 | Atkins |
| 5,689,100 A | 11/1997 | Carrithers et al. | 5,852,812 A | 12/1998 | Reeder |
| 5,689,650 A | 11/1997 | McClelland et al. | 5,857,079 A | 1/1999 | Claus et al. |
| 5,692,132 A | 11/1997 | Hogan | 5,857,175 A | 1/1999 | Day |
| 5,696,907 A | 12/1997 | Tom | 5,857,709 A | 1/1999 | Chock |
| 5,698,837 A | 12/1997 | Furuta | 5,859,419 A | 1/1999 | Wynn |
| 5,699,528 A | 12/1997 | Hogan | 5,864,609 A | 1/1999 | Cross et al. |
| 5,703,344 A | 12/1997 | Bezy et al. | 5,864,828 A | 1/1999 | Atkins |
| 5,704,046 A | 12/1997 | Hogan | 5,864,830 A | 1/1999 | Armetta et al. |
| 5,705,798 A | 1/1998 | Tarbox | RE36,116 E | 2/1999 | McCarthy |
| 5,708,422 A | 1/1998 | Blonder et al. | 5,870,718 A | 2/1999 | Spector |
| 5,710,458 A | 1/1998 | Iwasaki | 5,870,721 A | 2/1999 | Norris |
| 5,710,886 A | 1/1998 | Christensen et al. | 5,875,437 A | 2/1999 | Atkins |
| 5,710,887 A | 1/1998 | Chelliah | 5,883,377 A | 3/1999 | Chapin, Jr. |
| 5,710,889 A | 1/1998 | Clark et al. | 5,883,810 A | 3/1999 | Franklin et al. |
| 5,715,399 A | 2/1998 | Bezos | 5,884,271 A | 3/1999 | Pitroda |
| 5,717,925 A | 2/1998 | Harper et al. | 5,884,278 A | 3/1999 | Powell |
| 5,721,768 A | 2/1998 | Stimson et al. | 5,884,285 A | 3/1999 | Atkins |
| 5,721,781 A | 2/1998 | Deo et al. | 5,887,065 A | 3/1999 | Audebert |
| 5,726,884 A | 3/1998 | Sturgeon et al. | 5,890,138 A | 3/1999 | Godin et al. |
| 5,727,153 A | 3/1998 | Powell | 5,890,140 A | 3/1999 | Clark et al. |
| 5,728,998 A | 3/1998 | Novis et al. | H1794 H | 4/1999 | Claus |
| 5,729,693 A | 3/1998 | Holda-Fleck | 5,897,620 A | 4/1999 | Walker et al. |
| 5,734,154 A | 3/1998 | Jachimowicz et al. | 5,897,621 A | 4/1999 | Boesch et al. |
| 5,734,838 A | 3/1998 | Robinson | 5,901,303 A | 5/1999 | Chew |
| 5,736,728 A | 4/1998 | Matsubara | 5,905,246 A | 5/1999 | Fajkowski |
| 5,737,421 A | 4/1998 | Audebert | 5,907,142 A | 5/1999 | Kelsey |
| 5,740,549 A | 4/1998 | Reilly et al. | 5,907,350 A | 5/1999 | Nemirofsky |
| 5,742,775 A | 4/1998 | King | 5,911,135 A | 6/1999 | Atkins |
| 5,745,049 A | 4/1998 | Akiyama et al. | 5,911,136 A | 6/1999 | Atkins |
| 5,745,706 A | 4/1998 | Wolfberg et al. | 5,914,472 A | 6/1999 | Foladare et al. |
| 5,749,075 A | 5/1998 | Toader et al. | 5,920,629 A | 7/1999 | Rosen |
| 5,760,381 A | 6/1998 | Stich et al. | 5,920,844 A | 7/1999 | Hotta et al. |

| Patent No. | Date | Inventor |
|---|---|---|
| 5,920,847 A | 7/1999 | Kolling et al. |
| 5,923,734 A | 7/1999 | Taskett |
| 5,926,800 A | 7/1999 | Baronowski et al. |
| 5,928,082 A | 7/1999 | Clapper, Jr. |
| 5,930,217 A | 7/1999 | Kayanuma |
| 5,931,764 A | 8/1999 | Freeman et al. |
| 5,933,817 A | 8/1999 | Hucal |
| 5,937,068 A | 8/1999 | Audebert |
| 5,937,396 A | 8/1999 | Konya |
| 5,940,811 A | 8/1999 | Norris |
| 5,946,669 A | 8/1999 | Polk |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,956,695 A | 9/1999 | Carrithers et al. |
| 5,956,876 A * | 9/1999 | Burdette et al. .......... 40/606.02 |
| 5,963,647 A | 10/1999 | Downing et al. |
| 5,963,648 A | 10/1999 | Rosen |
| 5,963,925 A | 10/1999 | Kolling et al. |
| 5,970,478 A | 10/1999 | Walker et al. |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,979,757 A | 11/1999 | Tracy |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,743 A | 11/1999 | Irving et al. |
| 5,991,748 A | 11/1999 | Taskett |
| 5,991,750 A | 11/1999 | Watson |
| 5,999,596 A | 12/1999 | Walker et al. |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |
| 6,004,681 A | 12/1999 | Epstein et al. |
| 6,006,988 A | 12/1999 | Behrmann et al. |
| 6,009,415 A | 12/1999 | Shurling et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,019,284 A | 2/2000 | Freeman et al. |
| 6,021,189 A | 2/2000 | Vu |
| 6,026,370 A | 2/2000 | Jermyn |
| 6,029,139 A | 2/2000 | Cunningham et al. |
| 6,029,144 A | 2/2000 | Barrett et al. |
| 6,029,890 A | 2/2000 | Austin |
| 6,032,136 A | 2/2000 | Brake, Jr. et al. |
| 6,032,859 A | 3/2000 | Muehlberger et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,044,360 A | 3/2000 | Picciallo |
| 6,045,042 A | 4/2000 | Ohno |
| 6,047,067 A | 4/2000 | Rosen |
| 6,047,268 A | 4/2000 | Bartoli et al. |
| 6,048,271 A | 4/2000 | Barcelou |
| 6,049,463 A | 4/2000 | O'Malley et al. |
| 6,049,773 A | 4/2000 | McCormack et al. |
| 6,049,782 A | 4/2000 | Gottesman et al. |
| 6,055,573 A | 4/2000 | Gardenswartz et al. |
| 6,058,378 A | 5/2000 | Clark et al. |
| 6,061,660 A | 5/2000 | Eggleston et al. |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,085,976 A | 7/2000 | Scher |
| 6,089,284 A | 7/2000 | Kaehler et al. |
| 6,091,817 A | 7/2000 | Bertina et al. |
| 6,092,056 A | 7/2000 | Tull, Jr. et al. |
| 6,092,057 A | 7/2000 | Zimmermann et al. |
| 6,095,412 A | 8/2000 | Bertina et al. |
| 6,095,416 A | 8/2000 | Grant et al. |
| 6,098,053 A | 8/2000 | Slater |
| 6,105,011 A | 8/2000 | Morrison, Jr. |
| 6,105,865 A | 8/2000 | Hardesty |
| 6,109,525 A | 8/2000 | Blomqvist et al. |
| 6,112,191 A | 8/2000 | Burke |
| 6,115,458 A | 9/2000 | Taskett |
| 6,119,097 A | 9/2000 | Ibarra |
| 6,119,103 A | 9/2000 | Basch et al. |
| 6,119,107 A | 9/2000 | Polk |
| 6,119,932 A | 9/2000 | Maloney et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,129,572 A | 10/2000 | Feldman et al. |
| 6,134,309 A | 10/2000 | Carson |
| 6,134,536 A | 10/2000 | Shepherd |
| 6,138,911 A | 10/2000 | Fredregill et al. |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,173,272 B1 | 1/2001 | Thomas et al. |
| 6,182,048 B1 | 1/2001 | Osborn et al. |
| 6,182,894 B1 | 2/2001 | Hackett et al. |
| 6,186,793 B1 | 2/2001 | Brubaker |
| 6,188,309 B1 | 2/2001 | Levine |
| 6,189,787 B1 | 2/2001 | Dorf |
| 6,192,113 B1 | 2/2001 | Lorsch |
| 6,195,644 B1 | 2/2001 | Bowie |
| 6,202,053 B1 | 3/2001 | Christiansen et al. |
| RE37,122 E | 4/2001 | Levine et al. |
| 6,213,392 B1 | 4/2001 | Zuppichich |
| 6,222,914 B1 | 4/2001 | McMullin |
| 6,223,143 B1 | 4/2001 | Weinstock et al. |
| 6,227,447 B1 | 5/2001 | Campisano |
| 6,243,688 B1 | 6/2001 | Kalina |
| 6,260,758 B1 * | 7/2001 | Blumberg .................. 235/379 |
| 6,263,316 B1 | 7/2001 | Khan et al. |
| 6,265,977 B1 | 7/2001 | Vega et al. |
| 6,278,981 B1 | 8/2001 | Dembo et al. |
| 6,289,322 B1 | 9/2001 | Kitchen et al. |
| 6,292,786 B1 | 9/2001 | Deaton et al. |
| 6,295,344 B1 | 9/2001 | Marshall |
| 6,295,522 B1 | 9/2001 | Boesch |
| 6,298,336 B1 | 10/2001 | Davis et al. |
| 6,308,268 B1 | 10/2001 | Audebert |
| 6,308,887 B1 | 10/2001 | Korman et al. |
| 6,315,195 B1 | 11/2001 | Ramachandran |
| 6,324,524 B1 | 11/2001 | Lent et al. |
| 6,324,526 B1 | 11/2001 | DAgostino |
| 6,327,575 B1 | 12/2001 | Katz |
| 6,330,543 B1 | 12/2001 | Kepecs |

| | | |
|---|---|---|
| 6,330,546 B1 | 12/2001 | Gopinathan et al. |
| 6,330,939 B1 * | 12/2001 | Pratt ..................... 194/206 |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,349,972 B1 | 2/2002 | Geiger et al. |
| 6,360,954 B1 | 3/2002 | Barnardo |
| 6,366,220 B1 | 4/2002 | Elliott |
| 6,366,967 B1 | 4/2002 | Wagner |
| 6,373,969 B1 | 4/2002 | Adler |
| 6,374,230 B1 | 4/2002 | Walker et al. |
| 6,377,669 B1 | 4/2002 | Walker et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,409,593 B1 | 6/2002 | Petrecca |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,454,647 B1 | 9/2002 | Woodbury, Jr. |
| 6,456,981 B1 | 9/2002 | Dejaeger et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,146 B2 | 11/2002 | Day et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,488,203 B1 | 12/2002 | Stoutenburg et al. |
| 6,490,568 B1 | 12/2002 | Omara et al. |
| 6,498,861 B1 | 12/2002 | Hamid et al. |
| D468,789 S | 1/2003 | Arnold et al. |
| 6,502,747 B1 | 1/2003 | Stoutenburg et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,529,880 B1 | 3/2003 | McKeen et al. |
| 6,553,113 B1 | 4/2003 | Dhir et al. |
| 6,554,184 B1 | 4/2003 | Amos |
| 6,557,039 B1 | 4/2003 | Leong et al. |
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,560,581 B1 | 5/2003 | Fox et al. |
| 6,561,657 B1 | 5/2003 | Schofield |
| 6,567,786 B1 | 5/2003 | Bibelnieks et al. |
| 6,567,821 B1 | 5/2003 | Polk |
| 6,571,216 B1 | 5/2003 | Mittal et al. |
| 6,574,603 B1 | 6/2003 | Dickson et al. |
| 6,581,839 B1 | 6/2003 | Lasch et al. |
| D476,681 S | 7/2003 | Al Amri |
| D477,359 S | 7/2003 | Haas |
| 6,592,044 B1 | 7/2003 | Wong et al. |
| 6,601,040 B1 | 7/2003 | Kolls |
| 6,601,761 B1 | 8/2003 | Katis |
| 6,607,127 B2 | 8/2003 | Wong |
| 6,609,111 B1 | 8/2003 | Bell |
| 6,609,113 B1 | 8/2003 | O'Leary et al. |
| 6,609,654 B1 | 8/2003 | Anderson et al. |
| 6,609,658 B1 | 8/2003 | Sehr |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,693,544 B1 | 2/2004 | Hebbecker |
| 6,732,919 B2 | 5/2004 | Macklin et al. |
| 6,736,314 B2 | 5/2004 | Cooper et al. |
| D490,840 S | 6/2004 | Arakaki et al. |
| D491,186 S | 6/2004 | Arakaki et al. |
| D491,953 S | 6/2004 | Arakaki et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| 6,761,309 B2 | 7/2004 | Stoutenburg et al. |
| 6,769,605 B1 | 8/2004 | Magness |
| D495,736 S | 9/2004 | Scharf |
| D496,365 S | 9/2004 | Liu et al. |
| 6,793,135 B1 | 9/2004 | Ryoo |
| 6,802,008 B1 | 10/2004 | Ikefuji et al. |
| 6,805,287 B2 | 10/2004 | Bishop |
| 6,805,288 B2 | 10/2004 | Routhenstein et al. |
| D498,236 S | 11/2004 | Liu et al. |
| 6,856,973 B1 | 2/2005 | Bott |
| 6,865,547 B1 | 3/2005 | Brake, Jr. et al. |
| 6,868,426 B1 | 3/2005 | Mankoff |
| 6,874,612 B1 * | 4/2005 | Uland ..................... 194/212 |
| 6,876,971 B1 | 4/2005 | Burke |
| D505,450 S | 5/2005 | Lauer et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,942,569 B2 | 9/2005 | Petracca |
| 6,945,453 B1 | 9/2005 | Schwarz, Jr. |
| 6,961,710 B1 | 11/2005 | Yanagisawa et al. |
| 6,970,830 B1 | 11/2005 | Samra et al. |
| 6,978,369 B2 | 12/2005 | Wheeler et al. |
| 6,999,943 B1 | 2/2006 | Johnson et al. |
| 7,006,992 B1 | 2/2006 | Packwood |
| 7,014,110 B2 | 3/2006 | Minowa et al. |
| 7,025,256 B1 | 4/2006 | Drummond et al. |
| 7,039,600 B1 | 5/2006 | Meek et al. |
| 7,051,925 B2 | 5/2006 | Schwarz, Jr. |
| 7,070,094 B2 | 7/2006 | Stoutenburg et al. |
| 7,072,864 B2 | 7/2006 | Brake, Jr. et al. |
| 7,072,909 B2 | 7/2006 | Polk |
| 7,076,465 B1 | 7/2006 | Blagg et al. |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D533,220 S | 12/2006 | Graves et al. |
| 7,163,153 B2 | 1/2007 | Blossom |
| 7,165,049 B2 | 1/2007 | Slater |
| D538,349 S | 3/2007 | Hollands |
| 7,191,952 B2 | 3/2007 | Blossom |
| 7,216,091 B1 | 5/2007 | Blandina et al. |
| 7,225,155 B1 | 5/2007 | Polk |
| 7,228,155 B2 | 6/2007 | Saunders |

| | | | | | | |
|---|---|---|---|---|---|---|
| 7,243,839 B2 | 7/2007 | Beck et al. | | 2002/0194081 A1 | 12/2002 | Perkowski |
| 7,249,092 B2 | 7/2007 | Dunn et al. | | 2002/0195486 A1 | 12/2002 | Erb et al. |
| 7,249,112 B2 | 7/2007 | Berardi et al. | | 2003/0004828 A1 | 1/2003 | Epstein |
| 7,252,223 B2 | 8/2007 | Schofield | | 2003/0018613 A1 | 1/2003 | Oytac |
| 7,263,507 B1 | 8/2007 | Brake, Jr. et al. | | 2003/0023549 A1 | 1/2003 | Armes et al. |
| D551,705 S | 9/2007 | Mershon | | 2003/0028483 A1 | 2/2003 | Sanders et al. |
| 7,295,999 B1 | 11/2007 | Simon et al. | | 2003/0028518 A1 | 2/2003 | Mankoff |
| 7,306,141 B1 | 12/2007 | Schwarz, Jr. | | 2003/0033211 A1 | 2/2003 | Haines et al. |
| 7,311,244 B1 | 12/2007 | Schwarz, Jr. | | 2003/0033246 A1 | 2/2003 | Slater |
| 7,312,707 B1 | 12/2007 | Bishop et al. | | 2003/0034388 A1 | 2/2003 | Routhenstein et al. |
| 7,315,843 B2 | 1/2008 | Diveley et al. | | 2003/0040927 A1 | 2/2003 | Sato et al. |
| 7,346,567 B2 | 3/2008 | Weeks | | 2003/0040959 A1 | 2/2003 | Fei et al. |
| 7,349,866 B2 | 3/2008 | Schwarz, Jr. | | 2003/0046249 A1 | 3/2003 | Wu |
| 7,357,331 B2 | 4/2008 | Blossom | | 2003/0053609 A1 | 3/2003 | Risafi et al. |
| 7,392,222 B1 | 6/2008 | Hamilton et al. | | 2003/0061157 A1 | 3/2003 | Hirka et al. |
| 7,392,224 B1 | 6/2008 | Bauer et al. | | 2003/0074290 A1 | 4/2003 | Clore |
| 7,424,970 B2 | 9/2008 | Royce-Winston et al. | | 2003/0101119 A1 | 5/2003 | Persons et al. |
| 7,493,288 B2 | 2/2009 | Biship et al. | | 2003/0105672 A1 | 6/2003 | Epstein et al. |
| 7,591,416 B2 | 9/2009 | Blossom | | 2003/0105714 A1 | 6/2003 | Alarcon-Luther et al. |
| 7,606,734 B2 | 10/2009 | Baig et al. | | 2003/0110111 A1 | 6/2003 | Nalebuff et al. |
| 7,610,222 B2 | 10/2009 | Neofytides et al. | | 2003/0126017 A1 | 7/2003 | Rau et al. |
| 7,617,157 B2 | 11/2009 | Seifert et al. | | 2003/0135462 A1 | 7/2003 | Brake, Jr. et al. |
| 2001/0011227 A1 | 8/2001 | Ashery et al. | | 2003/0140004 A1 | 7/2003 | O'Leary et al. |
| 2001/0011243 A1 | 8/2001 | Dembo et al. | | 2003/0144935 A1 | 7/2003 | Sobek |
| 2001/0027389 A1 | 10/2001 | Beverina et al. | | 2003/0154125 A1 | 8/2003 | Mittal et al. |
| 2001/0027441 A1 | 10/2001 | Wankmueller | | 2003/0163403 A1 | 8/2003 | Chen et al. |
| 2001/0034647 A1 | 10/2001 | Marks et al. | | 2003/0163415 A1 | 8/2003 | Shanny et al. |
| 2001/0034682 A1 | 10/2001 | Knight et al. | | 2003/0163416 A1 | 8/2003 | Kitajima |
| 2001/0037315 A1 | 11/2001 | Saliba et al. | | 2003/0167218 A1 | 9/2003 | Field et al. |
| 2001/0044293 A1 | 11/2001 | Morgan | | 2003/0172040 A1 | 9/2003 | Kemper et al. |
| 2001/0047332 A1 | 11/2001 | Gonen-Friedman et al. | | 2003/0187787 A1 | 10/2003 | Freund |
| 2001/0047342 A1 | 11/2001 | Cuervo | | 2003/0195808 A1 | 10/2003 | Brown et al. |
| 2001/0051917 A1 | 12/2001 | Bissonette et al. | | 2003/0200143 A9 | 10/2003 | Walker et al. |
| 2001/0054003 A1 | 12/2001 | Chien et al. | | 2003/0200180 A1 | 10/2003 | Phelan et al. |
| 2001/0056398 A1 | 12/2001 | Scheirer | | 2003/0204421 A1 | 10/2003 | Houle et al. |
| 2002/0019793 A1 | 2/2002 | Frattalone | | 2003/0213843 A1 | 11/2003 | Jackson |
| 2002/0019803 A1 | 2/2002 | Muller | | 2003/0216965 A1 | 11/2003 | Libman |
| 2002/0026418 A1 | 2/2002 | Koppel et al. | | 2003/0217005 A1 | 11/2003 | Drummond et al. |
| 2002/0032609 A1 | 3/2002 | Wilkman | | 2003/0217329 A1 | 11/2003 | Good |
| 2002/0046089 A1 | 4/2002 | Zorn | | 2003/0218066 A1 | 11/2003 | Fernandes et al. |
| 2002/0046255 A1 | 4/2002 | Moore et al. | | 2003/0229525 A1 | 12/2003 | Callahan et al. |
| 2002/0059139 A1 | 5/2002 | Evans | | 2004/0024672 A1 | 2/2004 | Brake, Jr. et al. |
| 2002/0062235 A1 | 5/2002 | Wahlbin et al. | | 2004/0029569 A1 | 2/2004 | Khan et al. |
| 2002/0065712 A1 | 5/2002 | Kawan et al. | | 2004/0030626 A1 | 2/2004 | Libman |
| 2002/0065720 A1 | 5/2002 | Carswell et al. | | 2004/0039588 A1 | 2/2004 | Libman |
| 2002/0077964 A1 | 6/2002 | Brody et al. | | 2004/0049452 A1 | 3/2004 | Blagg |
| 2002/0077978 A1 | 6/2002 | O'Leary et al. | | 2004/0059952 A1 | 3/2004 | Newport et al. |
| 2002/0082990 A1 | 6/2002 | Jones | | 2004/0064402 A1 | 4/2004 | Dreyer et al. |
| 2002/0087462 A1 | 7/2002 | Seifert et al. | | 2004/0093296 A1 | 5/2004 | Phelan et al. |
| 2002/0091572 A1 | 7/2002 | Anderson et al. | | 2004/0093303 A1 | 5/2004 | Picciallo |
| 2002/0091631 A1 | 7/2002 | Usui | | 2004/0094624 A1 | 5/2004 | Fernandes et al. |
| 2002/0095365 A1 | 7/2002 | Slavin et al. | | 2004/0098339 A1 | 5/2004 | Malek et al. |
| 2002/0099586 A1 | 7/2002 | Bladen et al. | | 2004/0098351 A1 | 5/2004 | Duke |
| 2002/0104878 A1 | 8/2002 | Seifert et al. | | 2004/0103431 A1 | 5/2004 | Davenport et al. |
| 2002/0111916 A1 | 8/2002 | Coronna et al. | | 2004/0118914 A1 | 6/2004 | Smith et al. |
| 2002/0116271 A1 | 8/2002 | Mankoff | | 2004/0128186 A1 | 7/2004 | Breslin et al. |
| 2002/0116330 A1 | 8/2002 | Hed et al. | | 2004/0128195 A1 | 7/2004 | Sorem |
| 2002/0117541 A1 | 8/2002 | Biggar et al. | | 2004/0149544 A1 | 8/2004 | Dal Ferro |
| 2002/0120627 A1 | 8/2002 | Mankoff | | 2004/0155101 A1 | 8/2004 | Royer et al. |
| 2002/0120642 A1 | 8/2002 | Fetherston | | 2004/0159700 A1 | 8/2004 | Khan et al. |
| 2002/0129221 A1 | 9/2002 | Borgin et al. | | 2004/0193539 A1 | 9/2004 | Sullivan |
| 2002/0133461 A1 | 9/2002 | Ramachandran | | 2004/0215507 A1 | 10/2004 | Levitt et al. |
| 2002/0138418 A1 | 9/2002 | Zarin et al. | | 2004/0232223 A1 | 11/2004 | Beenau et al. |
| 2002/0143703 A1 | 10/2002 | Razvan et al. | | 2004/0239481 A1 | 12/2004 | Beenau |
| 2002/0145039 A1 | 10/2002 | Carroll | | 2004/0242308 A1 | 12/2004 | Gray |
| 2002/0147662 A1 | 10/2002 | Anderson | | 2004/0243498 A1 | 12/2004 | Duke |
| 2002/0156723 A1 | 10/2002 | Lilly et al. | | 2004/0252012 A1 | 12/2004 | Beenau et al. |
| 2002/0165771 A1 | 11/2002 | Walker et al. | | 2005/0021353 A1 | 1/2005 | Aviles et al. |
| 2002/0165820 A1 | 11/2002 | Anvekar et al. | | 2005/0021400 A1 | 1/2005 | Postrel |
| 2002/0169719 A1 | 11/2002 | Dively et al. | | 2005/0021457 A1 | 1/2005 | Johnson et al. |
| 2002/0174016 A1 | 11/2002 | Cuervo | | 2005/0027649 A1 | 2/2005 | Cech |
| 2002/0174018 A1 | 11/2002 | Bunger et al. | | 2005/0033619 A1 | 2/2005 | Barnes et al. |
| 2002/0178025 A1 | 11/2002 | Hansen et al. | | 2005/0035192 A1 | 2/2005 | Bonalle et al. |

| | | | |
|---|---|---|---|
| 2005/0035847 A1 | 2/2005 | Bonalle et al. | |
| 2005/0040242 A1 | 2/2005 | Beenau et al. | |
| 2005/0049950 A1 | 3/2005 | Johnson | |
| 2005/0065877 A1 | 3/2005 | Cleary et al. | |
| 2005/0071230 A1 | 3/2005 | Mankoff | |
| 2005/0075932 A1 | 4/2005 | Mankoff | |
| 2005/0077350 A1 | 4/2005 | Courtion et al. | |
| 2005/0086160 A1 | 4/2005 | Wong et al. | |
| 2005/0086167 A1 | 4/2005 | Brake, Jr. et al. | |
| 2005/0091138 A1 | 4/2005 | Awatsu | |
| 2005/0102228 A1 | 5/2005 | Srinivasan et al. | |
| 2005/0108152 A1 | 5/2005 | Tsao Lee et al. | |
| 2005/0114883 A1 | 5/2005 | Nagai et al. | |
| 2005/0116024 A1 | 6/2005 | Beenau et al. | |
| 2005/0119969 A1 | 6/2005 | Michelsen et al. | |
| 2005/0119979 A1 | 6/2005 | Murashita et al. | |
| 2005/0167488 A1 | 8/2005 | Higgins et al. | |
| 2005/0171898 A1 | 8/2005 | Bishop et al. | |
| 2005/0179251 A1 | 8/2005 | Wagoner et al. | |
| 2005/0189427 A1 | 9/2005 | Brown et al. | |
| 2005/0199705 A1 | 9/2005 | Beck et al. | |
| 2005/0216888 A1 | 9/2005 | Drummond et al. | |
| 2005/0234771 A1* | 10/2005 | Register et al. | 705/14 |
| 2005/0269396 A1 | 12/2005 | Schofield | |
| 2006/0026092 A1 | 2/2006 | Klein et al. | |
| 2006/0036553 A1 | 2/2006 | Gupta et al. | |
| 2006/0038004 A1 | 2/2006 | Rielly | |
| 2006/0039733 A1 | 2/2006 | Meyerhofer | |
| 2006/0041540 A1 | 2/2006 | Shannon et al. | |
| 2006/0047573 A1 | 3/2006 | Mitchell et al. | |
| 2006/0047589 A1 | 3/2006 | Grau | |
| 2006/0074794 A1 | 4/2006 | Nespola, Jr. | |
| 2006/0085334 A1 | 4/2006 | Murphy | |
| 2006/0106696 A1 | 5/2006 | Carlson | |
| 2006/0116903 A1 | 6/2006 | Becerra | |
| 2006/0122918 A1 | 6/2006 | Graboske et al. | |
| 2006/0131869 A1 | 6/2006 | Brignull | |
| 2006/0178937 A1 | 8/2006 | Rau et al. | |
| 2006/0191999 A1 | 8/2006 | Stoutenburg et al. | |
| 2006/0224480 A1 | 10/2006 | Bent et al. | |
| 2006/0242057 A1 | 10/2006 | Velarde | |
| 2006/0251478 A1 | 11/2006 | Desmeules | |
| 2006/0259364 A1 | 11/2006 | Strock et al. | |
| 2006/0277144 A1 | 12/2006 | Ranzini et al. | |
| 2007/0078719 A1 | 4/2007 | Schmitt et al. | |
| 2007/0094084 A1 | 4/2007 | Rau et al. | |
| 2007/0094154 A1 | 4/2007 | Rau et al. | |
| 2007/0156530 A1 | 7/2007 | Schmitt et al. | |
| 2007/0181674 A1 | 8/2007 | Taylor et al. | |
| 2007/0187484 A1 | 8/2007 | Cooper et al. | |
| 2007/0228144 A1 | 10/2007 | Knackstedt et al. | |
| 2007/0265924 A1 | 11/2007 | Schwarz | |
| 2008/0010202 A1 | 1/2008 | Schwarz | |
| 2008/0021841 A1 | 1/2008 | Rau et al. | |
| 2008/0177659 A1 | 7/2008 | Lacey et al. | |
| 2008/0195541 A1 | 8/2008 | Battaglini et al. | |
| 2008/0203150 A1 | 8/2008 | Royce-Winston et al. | |
| 2008/0210752 A1 | 9/2008 | March | |
| 2008/0215487 A1 | 9/2008 | Stoutenburg et al. | |
| 2009/0043651 A1 | 2/2009 | Schwarz | |
| 2009/0150370 A1 | 6/2009 | Christensen et al. | |
| 2009/0192906 A1 | 7/2009 | Rau et al. | |
| 2009/0265272 A1 | 10/2009 | Dill et al. | |
| 2009/0313106 A1 | 12/2009 | Taylor | |

FOREIGN PATENT DOCUMENTS

| | | |
|---|---|---|
| EP | 0843292 A2 | 5/1998 |
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 99-54841 | 10/1999 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 2005/043277 A3 | 5/2005 |
| WO | WO 2006/013218 | 2/2006 |
| WO | WO 2008021381 | 2/2008 |
| WO | WO 2008021382 | 2/2008 |

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

Song, A Card That Asks for ID, Time Magazine, Apr. 12, 2004, 1 page.

A Store Card Issuer Looks for Lift from Electronic Gift Certificates, Credit Card News, Feb. 1, 1995, 2 pages.

Claessens, et al., A Tangled World Wide Web of Security Issues, First Monday, retrieved from the internet at http://www.firstmonday.org/issues/issue7_3/claessens, retrieved from the internet on Oct. 6, 2006.

Hotchkiss, ATM's at the head of their class, Bank Marketing, vol. 29, No. 3, Mar. 1997, pp. 26-32.

Edwards, ATMs the Hot New Media Buy, ABA Banking Journal, Mar. 1999, pp. 58, 60.

American Express Incentive Services, Incentive, Sep. 1996, p. 126.

Fickenscher, Amex Prepaid Offering is Latest Card for Firms Regarding Employees, American Banker, vol. 161, No. 151, Aug. 8, 1996, pp. 1-2.

Neumann, An Enhanced Neural Network Technique for Software Risk Analysis, IEEE Transactions on Software Engineering, vol. 28, No. 9, Sep. 1, 2002, pp. 904-912.

Associates First Capital Corporation, Hoover's Inc., The Industry Standard: The Newsmagazine of the Internet Economy, thestandard.net/companies/company-display, Apr. 6, 1999.

Award Card Comparison, JA7922, 2006.

Brehl, Banks issue cash-card pledge, The Toronto Star, Oct. 9, 1997, 1 page.

Blockbuster running test of a stored value card, The American Banker, Sep. 1, 1995.

Meece, Boatman's Prepaid Cards for Worker-Incentive Firm, American Banker, Jul. 2, 1996, p. 12.

Boatmen's Floats Stored Value into the Employee Incentive Waters, Debit Card News, vol. 2, Issue 2, Jul. 16, 1996, 3 pages.

CES/NaBANCO introduces stored value card technology blockbuster video is first merchant partner, Business Wire, Inc., Jan. 15, 1996.

Card Based Award Systems, JA8309, 2006.

CardEx Incentives, www.cardex.com, Apr. 6, 1999.

CardFlash, Apr. 5, 2005.

Vandenengel, Cards on the Internet: Advertising on a $3 Bill, Industry Intelligence, Feb. 1, 1995, pp. 46-48.

Kutler, Cash Card Creator Looking Beyond Mondex, Feb. 9, 1995.

Rosen, Cash Just Isn't Flexible Enough: Shops of the Future Will Only Take Cards, Daily Express, Technology Section, Feb. 10, 1995, 1 page.

Bank, Cash, Check,Charge—What's Next?, Seattle Times, Mar. 6, 1995.

Morgan et al., Categorizing Risks for Risk Ranking, vol. 20, No. 1, Jun. 22, 2005, pp. 49-58.

Common electronic purse specifications, Business Requirements, Version 6.0, Dec. 1998.

Guidotti, Comparing Environmental risks: A Consultative Approach to Setting Priorities at the Community Level, Public Health Rev 1994, vol. 22, Jun. 16, 2005, pp. 321-337.

Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Hight, Jim, Consulting Services, www.strategies-tactics.com, 2006.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages, 2006.
First USA—Call 1(800)335-2453 to Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glossman, et al., Citicorp Company Report, Report No. 1647151, p. 8 of 16, 2006.
Machlis, Have it the smart way: Burger King program drives smart-card use, Computerworld, printed Feb. 23, 2001, 1 page.
Here's the calling convenience you asked for: 1-800-call-ATT . . . for All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
How is it Different?, JA8331, 2006.
Konrad, IBM had a Bunch of Unusual Ideas in 2003, www.philly.com, printed Jan. 21, 2004, posted on Jan. 13, 2004, 2 pages.
Incenticard, Bellsouth, JA8329, 2006.
Judy Quinn, Incentive Cards Explained, Incentive, Dec. 1995, 5 pages.
Incentive Firms Find Debit Cards a Rewarding Experience (Off-line debit card issuers converge efforts with companies looking for effective incentives to boost employee productivity and to motivate individuals to buy their products), Debit Card News, Vol., 2006.
Vincent Alonzo, Incentive Marketing . . . Three If by Smart Card, Incentive Sep. 1995, p. 11.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Meridian Award Cards, JA8251, 2006.
Meridian-the leader in card marketing, JA8343, 2006.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money; Schwat 1, The Inventor's Asset Management Account, Charles R. Schwab, Charles Schwab & Co., Inc., 16 pages, 2006.
Allen et al., Overview of Smart Cards and the Industry, Smart Cards: Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Card Based Award Systems, JA8309, Nov. 1, 1995.
Hight, Jim, Consulting Services, www.strategies-tactics.com, Jan. 1997.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
Definition of Store-Value card, Wikipedia, retrieved from the internet at http://en.wikipedia.org/wiki/Stored-value_card, retrieved from the internet on Apr. 16, 2007.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Ultimate Incentive, Incentive, Oct. 1995, 3 pages.

First USA—Activate Today and Get One Hour Free Calling Card Calls, Call 1-800-555-2535, First USA, 6 pages, Vol., Oct. 1997.
First USA—Call 1(800)335-2453 to Receive One Free Hour of Domestic Long Distance Calling ( No Strings Attached), First USA, 6 pages, Dec. 1997.
Glossman, et al.,, Glossman, et al., Citicorp Company Report, Report No. 1647151, p. 8 of 16, Oct. 15, 1995.
How is it Different?, JA8331, Apr. 1992.
Incenticard, Bellsouth, JA8329, Jul. 2000.
Incentive Firms Find Debit Cards a Rewarding Experience (Off-line debit card issuers converge efforts with companies looking for effective incentives to boost employee productivity and to motivate individuals to buy their products), Debit Card News, Vol., Nov. 28, 1997.
Meridian Award Cards, JA8251, Aug. 2, 1989.
Meridian-the leader in card marketing, JA8343, Jul. 2000.
Meridicard vs. Debit Cards, JA7917, Aug. 2, 1989.
Schwab, Charles, Now 7 Ways for a better Total Return for Your Money; Schwat 1, The Inventor's Asset Management Account, Charles R. Schwab, Charles Schwab & Co., Inc., 16 pages, Sep. 1987.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic quarterly, 1996, Economic Quarterly, v82, n3, p. 1(25), ISSN: 1069-7225, 17 pages.
Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment: Overview, p. 10-20, 1998.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Kenneth Hein, What's the Deal?, Incentive, Jul. 1998, 7 pages.
Machlis et al., Will smart cards replace ATMS?, Computerworld, printed Feb. 23, 2001, 3 pages.
Rossman, Kenneth, Summary Appraisal of Real Property, Feb. 15, 2002.
Wells Fargo Blazes New Trail for Homeowners, Oct. 2, 2002.
http://www.chevychasebank.com, $1,000 ATM Cash Sweepstakes, Official Rules, 4 pages, Aug. 2006.
Hamey, Kenneth, Home Asset Management Accounts Link Mortgages Equity Lines, Oct. 5, 2002.
Anonymous, Two Chips Can Be Better Than One, May 2001.

* cited by examiner

SYSTEM AND METHOD FOR GRANTING PROMOTIONAL REWARDS TO BOTH CUSTOMERS AND NON-CUSTOMERS

RELATED APPLICATIONS

This application claims priority to U.S. patent application Ser. No. 11/403,317 filed on Apr. 13, 2006 which in turn claims priority to Provisional Patent Application Ser. No. 60/771,581 filed Feb. 8, 2006, both of which disclosures are incorporated herein in its entirety.

This application is generally related by subject matter to the following applications: 10/683,294, filed Oct. 14, 2003, entitled "System and method for granting promotional rewards to credit account holders,"; 11/221,706, filed Sep. 9, 2005, entitled "Terminal for implementing simultaneous reward programs,"; and 11/185,847, filed Jul. 21, 2005, entitled "Personalized bank teller machine,". All of the aforementioned are hereby incorporated by reference in their entirety.

BACKGROUND

The present invention is generally directed to incentive programs for enabling both bank customers and non-bank customers to earn promotional awards. More particularly, the present invention is related to techniques for providing personalized promotional awards to bank customers for specific triggering behaviors, and for providing promotional awards to non-customers when using bank services.

There is a recognized need in the financial services industry to attract and retain loyal customers. A loyal customer is one who uses a single Bank for all or a significant number of banking relationships and does so over an extended period of time. The attraction and retention of loyal customers is particularly important to Banks that compete in highly competitive markets where customers are offered a wide variety of investment and other banking relationship options, some of which may individually be very enticing to existing customers of other banks.

Incentive programs, comprising of rewards and/or promotions may be used by various merchants to stimulate potential customers and to maintain the interest of existing customers. Rewards are typically given to customers by merchants for various reasons, including to encourage certain customer behaviors and to strengthen relationships between Banks and customers. Rewards can also be used to strengthen the relationships between merchants and customers, such as when a Bank offers a merchant-related reward such as a gift card, or for example, when a merchant or affiliated Bank offers a reward for using a particular credit card with the merchant.

Promotions may be directed at both existing and potential customers, and often center around "give-aways" and prizes. Promotions generally cause consumer interest in a merchant or a product of a merchant who may leverage this interest in an effort to generate new customers.

Incentive programs for rewarding existing customers have become increasingly common in a variety of industries. Well known examples are airline frequent flyer programs. In airline frequent flyer programs the customer is awarded points, often expressed in terms of "miles traveled" for each use of a particular airline or its partners or affiliates. Additional points or "miles" are awarded for use of ancillary services such as car and hotel room rentals. Other well-known examples of promotions range from the Publisher's Clearing House™Sweepstakes to McDonalds's™ Monopoly™ program.

However, the implementation of rewards and promotional programs directed at Bank customers has complexities not found in other industries. The relationships between the Bank and any customer may be quite numerous and complex, involving a number of different kinds of accounts and interactions. Additionally, unlike retail shopping, Bank customers are less likely to switch Banks based upon a generic promotion.

For an incentive program to be effective as a tool for both attracting potential customers and retaining existing customers, it may be desirable for the Bank to be able to monitor customer behaviors and the relationships between the Bank and its customers, so that the Bank may identify significant opportunities for marketing its financial services.

It may further be desirable for both existing and potential customers to track and manage their incentive programs. In addition to presenting the existing or potential customer with more control over the incentive program, providing customers with the ability to manage their incentive programs may provide the Bank with another channel of communication through which to reach existing and potential customers. It is known for Banks to develop incentive programs to attract and retain customers, typically consisting of a financial product such as a credit card that may allow customers to earn rewards in a predetermined rewards system. For instance, it is known in the art to offer a 1% cash rebate each time a customer uses a platinum credit card issued by the Bank. Such systems are disclosed, for example, in U.S. Pat. No. 5,025,372, to Burton et al., and assigned to Meridian Enterprises, Inc.

However, the known universe of reward-earning behaviors for such incentive programs is generally limited. Rewards are typically earned by charging transactions on a credit card account. Alternatively, rewards may be earned by performing certain tasks or exhibiting certain behaviors, such as by opening a bank account.

Known incentive programs generally have little penetration into the supply of potential customers. However, automated banking machines are well known, and are used by both existing and potential customers alike. A common type of automated banking machine used by consumers is an Automated Teller Machine (hereinafter "ATM"). ATMs enable both existing and potential customers to carry out a variety of banking transactions by interacting with the machine rather than a human teller. Examples of banking transactions that are commonly carried out using ATMs include withdrawals, deposits, transfer of funds between accounts, payment of bills, and account balance inquiries. Accordingly, it is desirable to use ATMs as a distribution vehicle for incentive programs.

Moreover, prior art incentive programs typically have limited reward-earning behaviors that earn limited rewards. A robust and efficient system of offering a plurality of incentive programs wherein the incentive programs enable existing and potential customers to earn a variety of rewards by accomplishing a variety of behaviors and/or transactions is desirable. It is further desirable to have an incentive program system that is customizable across a wide variety of variables.

SUMMARY OF THE INVENTION

Aspects of the invention include methods of operating a promotional program for customers of a Banking institution are disclosed, comprising the dispensing a receipt with a symbol or picture thereon redeemable for a prize, wherein the dispensing of the receipt is accomplished through the use of an automated teller machine (ATM); and wherein the ATM machine dispenses the receipt after successful completion of a transaction. The symbol or picture may be printed or stamped or affixed on the receipt dispensed from the ATM, either before or during the transaction. ATM receipts with the symbol or picture may be irregularly or randomly dispensed. Such promotional programs may be used to give away varied prizes, including but not limited to tickets for sporting events, concerts, special events, plays, and cultural events.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

DESCRIPTION OF THE DRAWINGS

In order to assist in the understanding of the invention, reference will now be made to the appended drawings, in which like reference characters refer to like elements. The drawings are exemplary only, and should not be construed as limiting the invention.

DETAILED DESCRIPTION OF THE INVENTION

Figure 1:
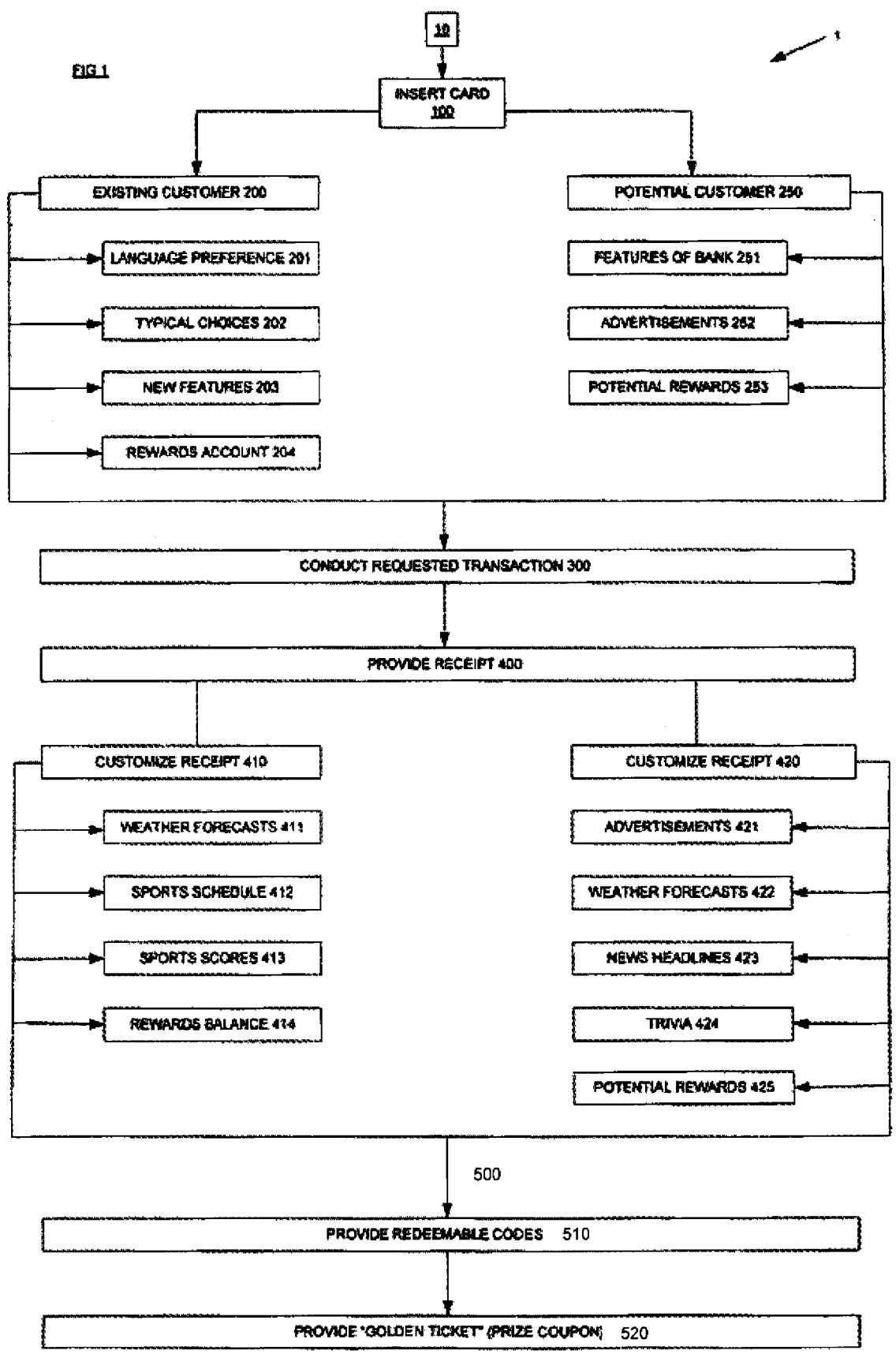
FIG. 1 is a block diagram, illustrating a financial transaction in accordance with some embodiments of the present invention.

As used herein, "Bank" or "Banks" refers to financial service institutions, including banks, savings and loan associations, credit unions, credit card issuers, and the like, which offer a variety of financial and investment services to customers, such as credit cards.

While much of the description below is set forth in terms of credit cards, it should be understood that the invention is readily applied, and should be considered to encompass, ATM based promotional and reward programs provided in connection with the use of other types of payment cards, including debit cards, check cards, transaction cards, ATM cards, prepaid debit cards, gift cards, stored value cards, other payment devices and the like.

As used herein, "Bank branch location" means any physical, brick-and-mortar, Bank location. The "Bank branch location" may offer either a limited or full selection of Bank programs, products, or services.

As used herein, "code" or "codes" refers to a number, sequence of numbers, alpha sequence, alpha-numeric sequence, or a sequence of symbols, images, etc. sequence provided as a reward or promotional gift to an existing or potential customer. Just by way of non-limiting example, a "code" may be indicative of a particular prize or offer, or it may be indicative of a certain number of "points" or other expression of a reward.

As used herein, "customer" means people and/or legal entities that use or receive any service or purchase any goods from the bank. "Customers" can be "existing customers" and "potential customers."

As used herein, "existing customer" or "existing customers" refers to a customer of record with a bank. This includes all customers who have any type of account with the Bank or relationship with the Bank.

As used herein, "points" mean a numerical indicator corresponding to redeemable value. "Points" may be redeemed for various prizes, products, and services, with each of the prizes, products, or services requiring the expenditure or redemption of a particular amount of "points." It should be understood that "points" can be expressed as such, e.g., 1000 points, or can be expressed in other units, such as "credits" (e.g., 1000 credits), "miles," or any other suitable unit identifier.

As used herein, "potential customer" means people who are not existing customers. "Potential customers" may or may not patronize Bank services, such as ATMs.

As used herein, "triggering behavior" means any consumer behavior that can trigger the earning of rewards in a rewards program.

As used herein, "reward" or "rewards" means some type of consideration or recognition established and given by the Bank, the Bank's partners, or third parties to the customer in recognition of the customer's specific behaviors in the specific time frame, such as gifts, cash rebates, frequent flyer miles, and points.

Reference will now be made in detail to embodiments of the invention, examples of which are illustrated in the accompanying drawings. Banks may offer incentive programs to both existing and potential customers. Incentive programs may be broken down into rewards programs typically directed at existing customers, and promotional programs typically directed at both existing and potential customers. According to one embodiment of the invention, rewards programs may reward a customer for particular behaviors, known as trigger behaviors. According to one embodiment, promotional programs may involve an element of chance and provide prizes to both existing and potential Bank customers.

The discussion below will generally be divided into discussion directed to promotions and rewards.

Promotions

A promotional system and method in accordance with some embodiments of the present invention will now be discussed. As noted above, ATMs may provide penetration to potential customers. Therefore, ATMs may be poised to be a distribution vehicle of promotional material to existing and potential customers alike. Similar to ATMs, point-of-sale (POS) devices may also provide penetration into the market of potential customers. It is contemplated that while ATMs are discussed below, similar promotional programs could be conducted using POS devices.

In accordance with some embodiments of the present invention, ATMs may be used to dispense so-called "golden tickets," or printed indicia, representing a particular prize. A "golden ticket" may have characteristics to immediately draw the attention of the customer, for example the ticket may be brightly colored gold. A "golden ticket" may be of a similar size and shape of the currency the ATM distributes, such that no machine modifications to the ATM will be required.

A "golden ticket" may be distributed randomly, which is intended to mean that "golden tickets" are not provided to each and every ATM user for each and every transaction. Instead, the tickets are provided sporadically in a fashion that has at least the appearance of being random to ATM users. For example, a golden ticket could be provided to each nth customer, such as to every 100 customers. Such an approach would be random within the context of the invention since it would appear to be random to the ATM users. Alternatively, a psuedo-random algorithm or other random number generating algorithm could be used to randomly distribute "golden tickets." For example, a "golden ticket" may be distributed to every nth customer of customers meeting certain criteria, such as residents of a particular state. Such algorithms for generating true random numbers or pseudo-random numbers are well known in the statistical arts.

It is also contemplated, however, that the "golden ticket" may be anything indicating to the customer that he or she has won or been awarded some form of a prize. For example, the "golden ticket" may be in the form of a rider removably attached to dispensed currency with adhesives (e.g., a "sticker"). A "golden ticket" may be a symbol or picture printed or stamped or otherwise affixed on an ATM receipt during the ATM transaction, or may be pre-printed or stamped or otherwise affixed on the paper that will be used as ATM receipts prior to the underlying transaction. The "golden ticket" may be a screen display on the ATM, informing an existing customer that a set amount of points or value has been added to their rewards account, or informing a potential customer that they should enter the nearest Bank branch location to redeem their prize. In other words, the "golden ticket" need not be a physical ticket. It need only inform the customer that a specified prize, points, or value, may be redeemed.

In addition, a "golden ticket" may be a symbol or picture printed on an ATM receipt. The symbol or picture printed on the ATM receipt may be either related or unrelated to the particular promotional program of which it is a part. For example, a promotional program that provides tickets to the Super Bowl may have a football printed on the ATM receipt. Similarly, a promotional program that provides tickets to the U.S. Open tennis tournament may indicate a winning ticket by printing a tennis ball on an ATM receipt. Alternatively, the symbol may not be directly related to the promotional program. For example, a star may be printed on an ATM receipt to indicate a winning ticket for a particular promotional program.

The symbol or picture printed on the ATM receipt may be printed in any location, either on the front or on the back of the receipt. The location of the symbol or picture may be set (e.g., upper right hand corner of the back of the receipt) or may be randomly or pseudo-randomly printed on the receipt (e.g., on either the front or the back of the receipt, in any location).

The prizes awarded through ATMs may vary, ranging from discounted or free Bank services to tangible goods and potentially money. For example, the "golden ticket" may represent an extended period of free bank services (e.g., checking), a reduced rate for bank services (e.g., 50% off financial planning services), or reduced interest rates for particular loans or equity arrangements. The "golden ticket" may also represent free or discounted services offered by third parties (e.g., free cellular phone service, or reduced rates for digital cable). The "golden ticket" may also, for example, entitle the customer to particular tangible goods, such as sports equipment or electronic equipment (e.g., a new television). The "golden ticket" may also entitle the customer to a specified amount of money (e.g., $1,000 or $10,000). The "golden ticket" may also, for example, represent a particular prize unrelated to financial services, such as tickets to a sporting event (e.g., the Super Bowl, the U.S. Open, etc.) concert, special event, play, or cultural event.

Redemption of the prizes may be required to occur inside a Bank branch location. The customer may or may not know what prize he or she is entitled to before attempting to redeem the "golden ticket" in the branch location. For example, the "golden ticket" may notify the customer that they are entitled to a prize of sorts, but may note that the prize can only be identified and redeemed inside a Bank branch location. The "golden ticket" may be redeemable at any Bank branch location, or redemption may be available only at particular Bank locations (this may be required for more substantial, valuable prizes). According to another approach, the "golden ticket" may identify the nature of the prize. According to yet another approach, the "golden ticket" may provide a phone number or web address for the customer to access in order to learn the nature of the prize.

Encouraging traffic of potential customers into Bank branch locations may be a valuable service to the Bank, because the presence of a potential customer in a Bank branch location provides various opportunities to convert the potential customer into an existing customer.

The customer may redeem the "golden ticket" by providing the "golden ticket" to a Bank teller or Bank officer. The customer's prize may be immediately available, or may be provided to the customer at a later date (i.e., if the prize needs to be shipped or if security verifications must take place). For some prizes, the customer may redeem the "golden ticket" by going to a web page operated by the Bank and inputting a indicia (e.g., a unique code) that may be printed on the "golden ticket." The customer may then follow additional steps as necessary to redeem his or her prize.

It is contemplated that security features and characteristics may, but are not required to be, included in, on, or associated with, the "golden ticket." Security features may verify that the "golden ticket" is legitimate and not counterfeit, and/or that the "golden ticket" was issued in an actual ATM transaction. Security features may include particular thermal signatures, watermarks, a checksum or verification elsewhere on the ATM receipt of the validity of the "golden ticket," scrambled indicia technology, and/or any other characteristic that may verify the validity of the "golden ticket." Records may also be kept of which particular ATM transaction resulted in the issuance of a "golden ticket." In this manner, verification of the validity of golden ticket may be confirmed. For example, the ATM may record that a "golden ticket" was issued at 11:53 AM to a particular customer during transaction number 3859632 and the issuance of a "golden ticket" may be matched to particular account information. When the customer redeems the "golden ticket" and the information recorded at the ATM matches the information noted on the customers ATM receipt, validity may be confirmed.

Alternatively, a code may be printed on the bottom of ATM receipts, or on a separate receipt. The code may be redeemed at the customer's personalized web page or at a web page operated by the Bank for such redemption. Alternatively, the ATM receipt may be brought into a Bank branch location to determine what the prize or amount of points may be redeemed with the code.

The codes may be indicative of particular points, or airline miles that may be applicable to a frequent flyer program. Both existing and potential customers may redeem these codes by visiting specified web pages (which, after registration may include a customer's personalized web page).

It is contemplated that in order to comply with various laws and regulations, such promotions may also be entered via the mailing of an address card to a specified address.

Business rules may be programmed in an ATM (or into a remote server or computer driving the ATM's functionality) to analyze an ATM user's profile and offer additional services. For example, if the user has an overdraft balance and a mortgage, an offer for a second mortgage or refinancing may appear. Similarly, if the user has a large balance in a savings or checking account, brokerage or other investment services may be offered.

Business rules may also be programmed to analyze the user's profile and provide coupons, messages ("alerts"), or other information to potential customer users based on the identity of the potential customer's present bank. When a potential customer logs on or accesses a bank or other financial institution's ATM system (e.g., to obtain dispensed currency), the ATM may identify the potential customer's home banking institution (e.g., using the BIN, Bank Identification Number, from the potential customer's card or payment device that is swiped, inserted, entered, read, blinked, or where the information is otherwise transferred from the customer's card or payment device to the ATM system). A message may be sent to the potential customer identifying products or services that are offered by the bank providing the ATM service but not offered by the potential customer's present banking institution. Upon determining what the potential customer's home banking institution is, the ATM may determine what services or programs that banking institution does not provide. For example, if the potential customer's home banking institution does not offer investment accounts or lines of equity, the ATM may display a message informing the potential customer that the Bank does offer these services. The services advertised may be determined in conjunction with the incentive programs. For example, if the ATM determines that the customer's home banking institution does not offer lines of equity, the ATM may advertise this service, and the code printed on the ATM receipt may entitle the potential customer to a temporary reduced interest rate on such a line of equity.

Rewards

A portion or all of the Bank's existing customers may be enrolled or participating in a rewards program, depending on the eligibility rules of the program. Eligibility rules may include local, state, and federal laws and regulations pertaining to promotions. It is contemplated that if any local, state, or federal law or regulation covers any aspect of the rewards or incentive program, the rewards or incentive program may be contoured accordingly. Potential customers may also be enrolled in the Bank's rewards program by providing specific information to the Bank. This may result in a personalized web page being set up for the potential customer so that the potential customer can manage his or her rewards. However, it is contemplated that while existing customers may receive a wide array of rewards from both the bank or affiliated third parties, rewards of a potential customer may be limited to discounted or free Bank products and services. In other words, for a potential customer to redeem his or her rewards, the potential customer may become an existing customer.

For existing customers, the rewards program may be associated with a customer account. Customers may choose from among a variety of rewards programs for a particular customer account. A rewards database may store customer-specific reward information for each customer, either existing or potential, enrolled in the Promotional Rewards Program.

The Bank may administer the rewards program. Alternatively, the rewards program could be administered by another entity, such as a Bank Partner or third party. A third party may be employed by the Bank to formulate, manage, and maintain the Bank's incentive programs.

The rewards program is generally associated with one or more earning behaviors (such as transactions) and one or more rewards which can be earned by the customer engaging in those behaviors. These behaviors may be referred to as "triggering behaviors," and are discussed in more detail below.

The Bank or third party may create rules or other information defining and governing the rewards program. These rules may govern various aspects of the rewards program, including but not limited to, the offers, the rewards, the redemption process, and the eligible population. A rule may comprise any instruction, parameter, macro, subroutine, program, or any other instruction set that may apply to one or more customers or population groups or any feature defining the rewards program.

Accumulation rules and redemption rules and options may similarly be established. Accumulation rules may, by way of example only, limit the number of rewards or points that can be accrued and redeemed by a customer. Redemption rules may also, by way of example only, require various identification procedures and various security processes. These rules may also define limitations for earning rewards currency and/or rewards.

The rules may also specify attributes or characteristics that limit or define the events, transactions, and triggering behaviors for which a customer may earn a reward or rewards. These attributes or characteristics may comprise transaction date, time, location, frequency, amount, and/or other triggering attributes.

Rewards accounts may be created and may be stored in a database. For existing customers, the reward account may be associated with one or more accounts the existing customer has with the bank. For potential customers, the reward account may only be associated with an indicia of identification of the potential customer (e.g., name, social security number, etc.). The reward account for existing customers may track the customer's transactions with the bank, and may provide additional rewards for passive actions (e.g., leaving funds in a savings account for a certain period of time). Reward accounts established for potential customers may only track the potential customer's interactions and transactions with the Bank, (e.g., ATM transactions). A personalized web page may access a rewards account in this rewards database, as discussed in more detail below.

In general, the rewards system may monitor customer transactions and behaviors in order to determine reward earnings. Based on personalized information (such as customer account information), specific rewards may be generated for the populations eligible to participate. The rewards system may additionally communicate the reward earnings to the customer, and report earnings information for internal or external auditing purposes.

As defined by the reward program, specific transactions and/or behaviors may earn rewards. For instance, an offer may define a population as all customers in Alabama, and the reward may be provided to Alabama customers based on customer address data. A reward such as this could be targeted at particular customers for a variety of reasons. For example, the reward may consist of reduced or free goods or services from local third parties, or may be directed at something of a local interest, such as a sports team. Additionally, rewards may be tailored based on customer location due to various laws and regulations governing such rewards and promotions in various states and localities. These types of geographic directed rewards may be focused at a specific population based on where, for existing customers, their domicile is listed on their account information, and/or based on where the customer transacts business with the Bank. In other words, although the domicile of a potential customer who uses the Bank's ATM may be unknown, the location of the ATM being used is known, and a reward may be tailored according to the ATM's geographic location.

As noted above, rewards of a potential customer may be limited to discounted or free Bank products and services. For a potential customer to redeem his or her rewards, the potential customer may become an existing customer.

Spending patterns of existing customers may similarly be analyzed, and based on such analysis, customers may receive more focused offers. When a customer uses a Bank credit card or Bank debit card (or other purchase card) to purchase various goods or services, the general category of the merchant with whom they are dealing is transmitted to the Bank. By way of example only, the Bank may be aware that a particular customer has used his or her debit card to spend a particular amount of money over a particular period at gasoline stations. With this information, the Bank may tailor then the customer's future rewards to gasoline station discounts and the like.

A customer may also earn a reward or reward currency (i.e., points) for the occurrence of specific triggering behaviors, transactions, and events related to a specific bank product. For instance, customers may earn rewards for payments, purchases, opening an account, first use of a product or account, cash advances, or another reward trigger in a demand deposit account, credit card, or other bank product.

In some embodiments in accordance with the present invention, rewards (such as points) may be earned for any of a variety of triggering behaviors or activities, such as enrolling in a program or service or establishing a relationship with a merchant or financial institution, such as by opening an account, applying for a car or home loan (or equity line of credit). Other triggering behaviors related to a relationship include signing up for (and doing) online bill payments from a specific account, staying in (and/or using) a program for a period of time (e.g., to earn program anniversary rewards), and ACH activity.

In some embodiments, rewards may be granted for establishing relationships with particular third parties with whom the Bank has a relationship with. For instance, a reward may be granted for obtaining a car loan from an automobile financing division of a bank that manages the reward account. A reward may also be granted for applying for a home loan or refinancing (or other loan or transaction), or for making monthly payments or maintaining an account pursuant to any such loan or transaction. The partner can be a true third party, such as a company the Bank co-brands a card with, e.g., a department store, a car manufacturer, and so forth.

Additional triggering behaviors which may cause rewards to accrue may comprise: credit and debit card transactions, such opening an account, paying a balance, paying interest, and linking with another account; other transactions associated with the Bank offering the reward, such as making a deposit, making a withdrawal, paying interest, drafting a check, paying a fee for a banking service; loan transactions, such as paying interest, transferring a balance, issuing a convenience check, and accessing a line of credit; a merchant purchase; checking and savings account activity; account payment transactions, such as setting up a recurring payment, enabling an auto-payment, paying an annual fee, or paying a rewards fee; transactions with Bank Partners; transactions with third parties; brokerage transactions, such as purchasing, selling, or trading stock or other securities; creating, purchasing, or otherwise transacting an interest in a mutual fund or margin account; depositing funds; creating a retirement account (such as an IRA or 401(k) account), contributing to or managing such an account, borrowing against such an account, or otherwise causing activity related to such an account; requesting information related to a product; purchasing insurance (such as home, auto, disability, or life insurance); and transferring holdings from an external account to a Bank account; and other transactions or behaviors.

It should be noted that some triggering behaviors do not necessarily require any specific action on the part of the cardholder. For example, the triggering behavior can be passive. For instance, in some circumstances maintaining a minimum account balance might be satisfied by merely refraining from withdrawing funds from the account. In some embodiments, customers may earn instant rewards, such as rewards that are earned immediately upon completion of a reward-triggering behavior. For instance, a customer may have a chance of winning an instant 20% rebate on any purchase during a specific month, or a customer may have a chance of winning a 10% coupon for visiting a particular merchant store, wherein the coupon is printed (or otherwise redeemable) instantaneously at the merchant premises.

As mentioned above, an existing customer's financial transactions may be tracked as to their general usage, thereby allowing more directed rewards (e.g., if a certain amount is spent on gasoline, points may be redeemed in free gasoline). Accordingly, it is contemplated that triggering behaviors may include a customer spending more than a predetermined threshold amount towards a particular usage. By way of example only, if a customer spends more than $100 in a month on gasoline, then the customer may be eligible for a particular reward. The reward may, but is not required to be, related to the underlying purchases. In other words, the reward may be a coupon for reduced price gasoline, or a lower incentive rate on new automobile loans.

Mortgages may play two roles in the incentive program. First, mortgage payments and/or their methods of payment (e.g., automatic bill-pay) may qualify as triggering behaviors. For example, making full and timely mortgage payments for a specified period of time may entitle the customer to a particular reward. Making payments through automatic bill-pay, making payments in excess of the amount due, or making payments early may similarly entitle the customer to a particular reward. These various attributes of mortgages may also entitle the customer to specified amount of points.

Second, mortgage features may also be redeemable as chance prizes. For example, prizes may consist of lower mortgage rates, discounted monthly payments, a month's payment free, or perhaps a "golden ticket" of having a Bank mortgage paid in full.

According to another approach, the "purchase" of CDs may be considered a triggering behavior. Similarly, the timely redemption of CDs may be considered a triggering behavior. These purchases or redemptions may also be entitle a customer to a specified amount of points.

A feature of some embodiments of the present invention is a personalized web page for all customers. The personalized web page may be initially set up when a customer receives a reward. When a customer visits a specified web site to redeem their reward or code, the customer may be prompted to enter identification information. This information may be utilized to determine if the customer is an existing customer. If the customer is not an existing customer, she may optionally be prompted with a questionnaire regarding her current banking programs. This information may be utilized to direct focused advertisements at the potential customer.

When existing customers sign up for an account of any kind with the Bank or enroll in any relationship with the Bank, the existing customer may be automatically enrolled in the incentive program, and a personalized webpage may be automatically generated for the customer. The customer may then access the personalized webpage via a link on a webpage regarding the customer's Bank account or relationship.

The web page may report to existing and potential customers their reward status (i.e., how many points the customer has accumulated, how many points are required for particular rewards, etc.). Based on information known about the customer and their accounts, marketing material may be focused and delivered to the existing customer on their web page. For existing customers, this information may include information regarding the status of customer accounts with the Bank. For potential customers, this information may be limited to the rewards and points accrued by the potential customer.

The personalized web page may customize the customer's statement of any account rewards, including information such as transaction history, reward earnings balance, reward earnings history, available reward programs or offers, rewards (such as earned coupons or rebate checks), or other information. The personalized web page may provide periodic summaries of earnings, balances, and redemption activity that can be separate from or part of reward account statements. The customer's history of reward earnings may be also be tracked by the qualifying trigger types, attributes, and/or by specific product or account. The information available on a potential customer's web page may, however, be limited to the codes, points, and other information known about the potential customer through the potential customer's inputs into the web page. The personalized web page may also allow customers to access their accounts and redeem rewards and promotions online.

In addition, the personalized web page may communicate to an existing customer what the customer must do to earn a particular reward, such as how many points would be earned for making purchases (or a specific purchase) using a credit card compared to how much would be earned for making the purchase using a debit card. The personalized web page may similarly communicate to a potential customer how many points or redemption options the potential customer would have available if the potential customer became an existing customer.

Similarly, the personalized web page may include content providing suggestions on what to do to optimize reward earnings. Both existing and potential customers may visit their personal web pages to manage their rewards and incentives. The personalized web page may also be used as another communication channel for the Bank to communicate with both existing and potential customers.

Communications with potential customers may be especially valuable because it may be one of very few avenues the Bank has of directly reaching potential customers. Through the website platform, tracking the potential customer's use of the Bank's products, and through information known about the potential customer's home bank, (i.e., interest rates, availability of particular services, etc.) the Bank may be able to provide more directed and useful information to the potential customer.

Additionally, through the website platform, the Bank may track the interaction of the various accounts and relationships the customer has with the Bank. By providing an instrument to access various Bank records, the Bank may be more aware of which customers have which various relationships with the Bank. In this manner, transactions in various accounts (e.g. credit cards, debit cards, investment accounts, etc.) may be linked.

Redeemable points or chances may also be awarded based on savings account deposits, frequency of deposits, and duration of deposits. For instance, if a customer maintains a minimum threshold amount of funds in their savings account for a minimum period of time, the customer may be entitled to an amount of points corresponding to the value and duration of their savings account. Similarly, a customer may be awarded points for frequently making deposits in the customer's savings account, for example once a week. Additionally, a customer may be awarded points for the manner in which the deposits into the savings account are made (e.g. through direct deposit from payroll, etc.).

Reference will now be made in detail to some embodiments in accordance with the present invention, examples of which are illustrated in the accompanying drawings.

With reference to FIG. 1, the steps of a financial transaction 1 conducted at an ATM will now be discussed. A customer 10 may approach an ATM to withdraw cash or use other services, such as checking balances, obtaining stamps, transferring funds, etc. The customer 10 may be an existing customer or a potential customer. The customer 10 may insert their ATM card into the ATM at step 100. The ATM card may be a card known and widely used in the art, consisting of a plastic card with a machine readable medium (e.g., a bar code or magnetic stripe) imprinted on the card. However, it is also contemplated that the customer's ATM card may be a "smart" card, a biometric card, and/or may communicate with the ATM through radio frequency identification (RFID card). Examples of existing RFID cards are the Chase Blink card and the MasterCard PayPass product. While this and other figures below are discussed in terms of the customer inserting an ATM card into the machine, other payment card devices could be inserted, such as debit cards, check cards, prepaid cards, gift cards, and so forth.

The ATM may be programmed to determine from the customer's ATM card whether the customer 10 is an existing customer of the Bank who provides the ATM. This information is generally easily deduced from the account information stored on the ATM card. If the customer 10 is an existing customer, then the process may follow step 200. If the customer is not an existing customer, but is a potential customer, then the process may follow step 250.

For existing customers, the ATM display and transaction may be personalized to the particular customer at step 200. For example, at step 201 the customer's language preference may be set. The customer's language preference may be set based upon the customer's options chosen when setting up his or her account at Bank, or the language preference may determined from the customer's last ATM use.

At step 202 the customer's most often selected choices may be presented. For example, if the customer consistently uses the ATM to withdraw funds from his or her checking account, an initial option may be "withdraw funds from checking account." More particularly, if the customer typically withdraws $80.00 from his or her checking account, an initial option may be "withdraw $80.00 from checking account." If the customer typically conducts several transactions at the ATM, such as viewing account balances, transferring funds and withdrawing funds, the customer may initially be presented with each of these options.

At step 203, new features or products that may be of interest to the existing customer may be displayed. For example, if the customer is known to have a mortgage with the Bank, the ATM may display refinancing options available through the Bank. Similarly, if the customer has an investment account with the Bank, the ATM may display new investment opportunities or products that the customer may be interested in.

Optionally, at step 204, the ATM may display the customer's rewards account. The display of the customer's rewards account may be a default display, or, in order to advertise the rewards program, for a limited time the display of the customer's rewards account may be the initial screen. Display of the customer's rewards account may also an option that may be selected along with options such as "view balance in checking account," "view balance in savings account," "withdraw funds," or "transfer funds."

For potential customers, the ATM and transaction may be personalized in a different manner at step 250. The ATM may determine, from the potential customer's ATM card, what their current banking institution is. At step 251, for example, the ATM may display Bank features that the Bank supplying the ATM may provide, that the potential customer's present bank does not. Or the ATM may display how the Bank supplying the ATM provides features or services in a manner that is more beneficial or advantageous than similar or same features as the consumer's home bank. For example, the ATM may indicate that the Bank provides free checking whereas the home bank charges for checking, that the Bank's credit card APR is 12% while the home banks credit card APR is 14.5%, and so forth. The features displayed may range from the somewhat large, for example mortgage options, to the everyday, for example reduced fees for using other bank's ATMs. If the customer consistently uses the ATM for features that are available through the customer current banking institution (e.g., to withdraw funds from their checking account), the ATM may display an alternative message encouraging the customer to switch to the ATM's Bank. This message may say, by way of example only, "Why pay ATM fees? Join Bank today!" or something similar.

At step 252, the ATM may display other advertisements directed to the potential customer. These advertisements may range from normal Bank slogans and/or logos, to information about the Banks rewards program.

At step 253, the ATM may display the amount of rewards the customer would earn if they became an existing customer. For example, the ATM may inform the customer that if the customer joins Bank, they would have accrued a certain number of frequent flyer miles. Alternatively, the ATM may inform the customer that if the customer joins the Bank, the customer would be entitled to the various discounted Bank services that may be redeemed by points accrued through ATM use.

At step 300, the ATM may conduct the requested transaction of the existing or potential customer. In other words, if the customer selected options to withdraw $40.00, the ATM would dispense $40.00. If the customer selected options to view balances or transfer funds, the ATM would display balances or would transfer funds.

At step 400, the ATM may provide the existing or potential customer with a receipt containing normal transaction information. This receipt would contain the typical information, such as account identifiers, time and date of the transaction, the nature of the transaction, the ATM that conducted the transaction, and any other appropriate information.

For existing customers, at step 410, the receipt may be further customized. For example, the receipt may have weather reports 411, schedules 412, or particular sports scores 413 printed on the receipt. This customization may be based on the existing customer's previous selections, or may be based on various patterns indicating that the customer may be interested in this information. In other words, if the customer fits a certain demographic profile the information may be so contoured. For example, if the customer is a 27 year old male, the ATM may display the schedule for local sports teams on the bottom of the receipt.

The receipt may also provide a rewards account balance to the existing customer at 414. The receipt may indicate to the customer the customer's balances (e.g., the number of points accrued, the number of frequent flyer miles accrued), as well as any prizes that the customer has earned or won that are pending redemption in a Bank branch. The receipt may delineate the amount of rewards that the customer has earned for the present transaction, and may also provide a balance of the total rewards the customer has accrued.

For potential customers, the ATM receipt may also be customized at step 420. The receipt may have directed advertisements at 421, optionally based on the transaction the customer just conducted (e.g., if the customer withdrew money from savings, advertise the Bank's savings account rate). The receipt may also have general interest information, such as weather reports 422, news headlines 423, or trivia 424. Optionally, the receipt may inform the potential customer what rewards they would have accrued if they became existing customers of the Bank.

Step 500 is optional, and comprises a promotional aspect. At step 510, redeemable codes (representing some indicia of a reward, e.g., points or frequent flyer miles) may be printed on the bottom of the ATM receipt for both existing and potential customers. Including the code on potential customer's receipts may drive some potential customer traffic to the Bank's redemption web page.

At step 520, the ATM may dispense, along with requested funds or a receipt a "golden ticket" to both existing and potential customers. This golden ticket may be redeemable for a prize. Prizes may range from discounted or free Bank services to money or physical prizes. Prizes may optionally may only be redeemed in a Bank branch location, in order to drive more traffic into a branch. As discussed above, the "golden ticket" may be in a variety of sizes, shapes, colors, and forms. The "golden ticket" may be a ticket actually dispensed with funds, or the "golden ticket" may be a rider (e.g. sticker) that may be placed on the dispensed receipt. The "golden ticket" may also be printed on a receipt, or may be separately dispensed with a receipt, i.e. printed on its own receipt. Additionally, a notice to the customer that a "golden ticket" has been awarded may be displayed on the ATM screen. This notice may direct the customer to either a Bank branch location or to the customer's personalized rewards account webpage.

Figure 2:
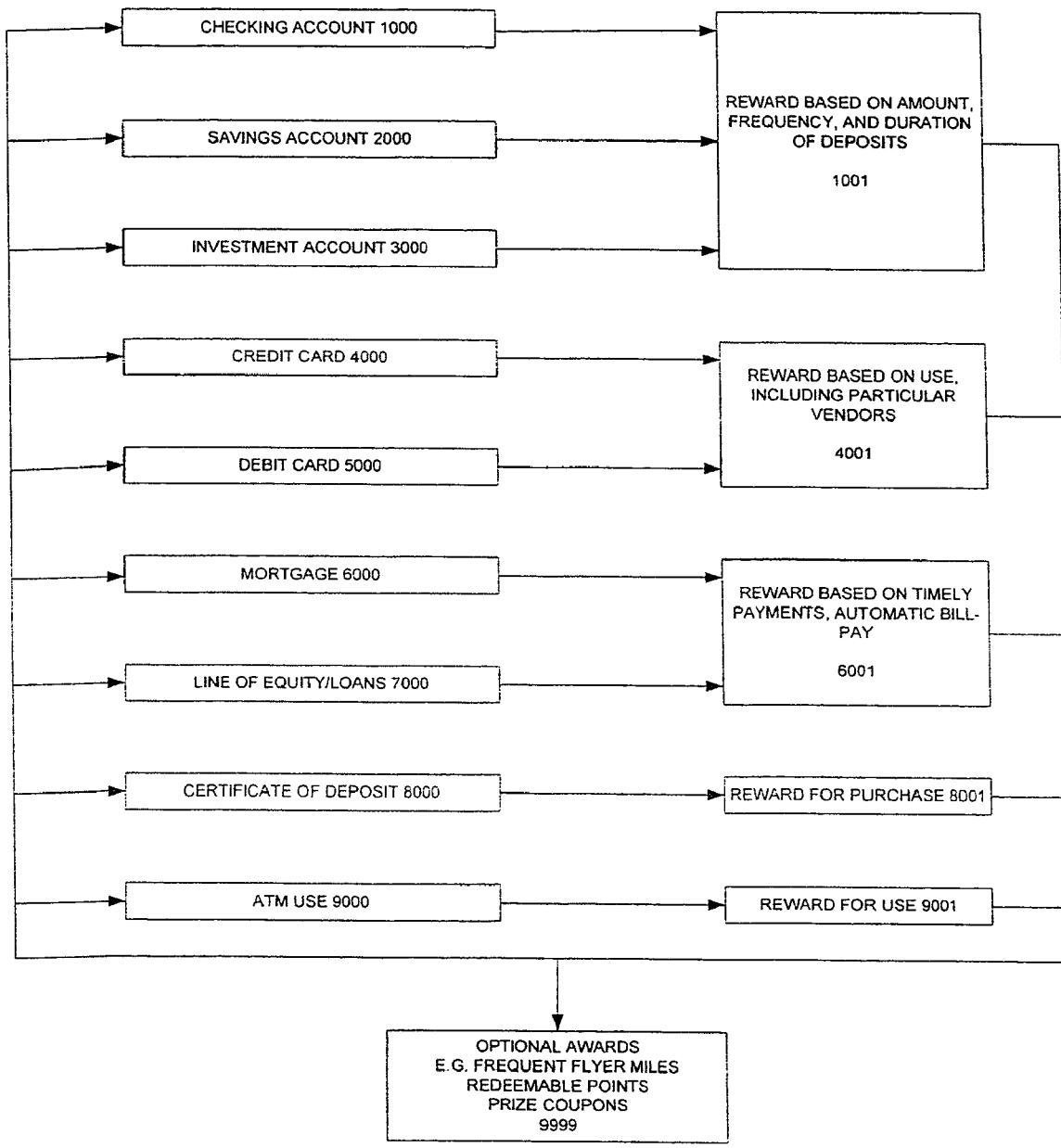
FIG. 2 is a block diagram, illustrating an incentive program in accordance with some embodiments of the present invention.

With reference to FIG. 2, a rewards program 2 in accordance with an embodiment of the present invention will now be discussed. For exemplary purposes, checking accounts 1000, savings accounts 2000, investment accounts 3000, credit cards 4000, debit cards 5000, mortgages 6000, lines of equity/loans 7000, certificate of deposits (CDs) 8000, and ATM use 9000 will be discussed. It is contemplated, however, that any of the panoply of financial transactions available at a Bank may generate rewards.

A customer 10 may partake in any of these financial services. Use of these services may generate rewards which may impact any other financial service that the customer 10 uses. For example, in block 1001, rewards may be awarded for the amount of money deposited in a checking 1000, savings 2000, or investment 3000 accounts.

The reward relating to these accounts may, for example, provide reduced rates or increased services for each of these accounts, or it may attempt to drive business to other financial services, by for example, offering a lowered interest rate on personal loans. For example, if the customer deposits more than a threshold amount into his or her checking account on a specified periodic basis, the customer may be entitled to free check printing. Alternatively, in order to cross-sell Bank services, the reward for such deposits in a checking account may be reduced fees for the customer to meet with Bank's financial planners or investment advisors.

Rewards for checking 1000, savings 2000, or investment 3000 accounts may also be awarded for duration of deposits 1002 (i.e., how long deposited funds were left in the account) or frequency of deposits 1003. Additional rewards may be awarded for direct deposit into these accounts 1004, or transfers between these accounts 1005.

With respect to credit cards 4000 and debit cards 5000, rewards may be awarded for use of the credit or debit card 4001. Optionally, enhanced or increased awards may be issued for use of the credit or debit card 4000, 5000 at particular retailers or for particular services 4002. In other words, the Bank may have certain agreements and/or relationships with various third parties. If the customer spends more than a threshold amount at any of these third party locations or retail establishments, the customer may be entitled to a specified amount of points. Additionally, the Bank may seek to encourage the use of certain payment cards over other payment cards through differential rewards. For example, the Bank may provide higher rewards for credit cards 4000 usage than for debit cards 5000 usage because the former is more profitable for the Bank.

With respect to mortgages 6000, rewards may be awarded based on timely payments 6001, payments made by automatic bill-pay 6002, or payments in excess of the amount due 6003. Rewards may also be awarded for obtaining a mortgage, including a second mortgage or a home equity loan. Repeat customers (e.g., customers who have had multiple mortgages with Bank) may also be entitled to rewards based upon their continued use of Bank's services.

With respect to CDs 8000, rewards may be awarded based on the number of CDs purchased 8001. Rewards for CDs 8000 may also be based on the timely redemption of the CDs, or on the number or size of CDs 8000 purchased.

With respect to ATM usage 9000, rewards may be awarded based on the amount of ATM use 9001, with enhanced rewards optional for use of the Bank's ATMs 9002. Rewards and/or points may also be accrued based on the various features of the ATM that the customer uses. For example, in addition to withdrawing funds and checking balances, the customer may be awarded a specified number of points for transferring funds with the ATM, or for purchasing stamps from the ATM.

Figure 3:
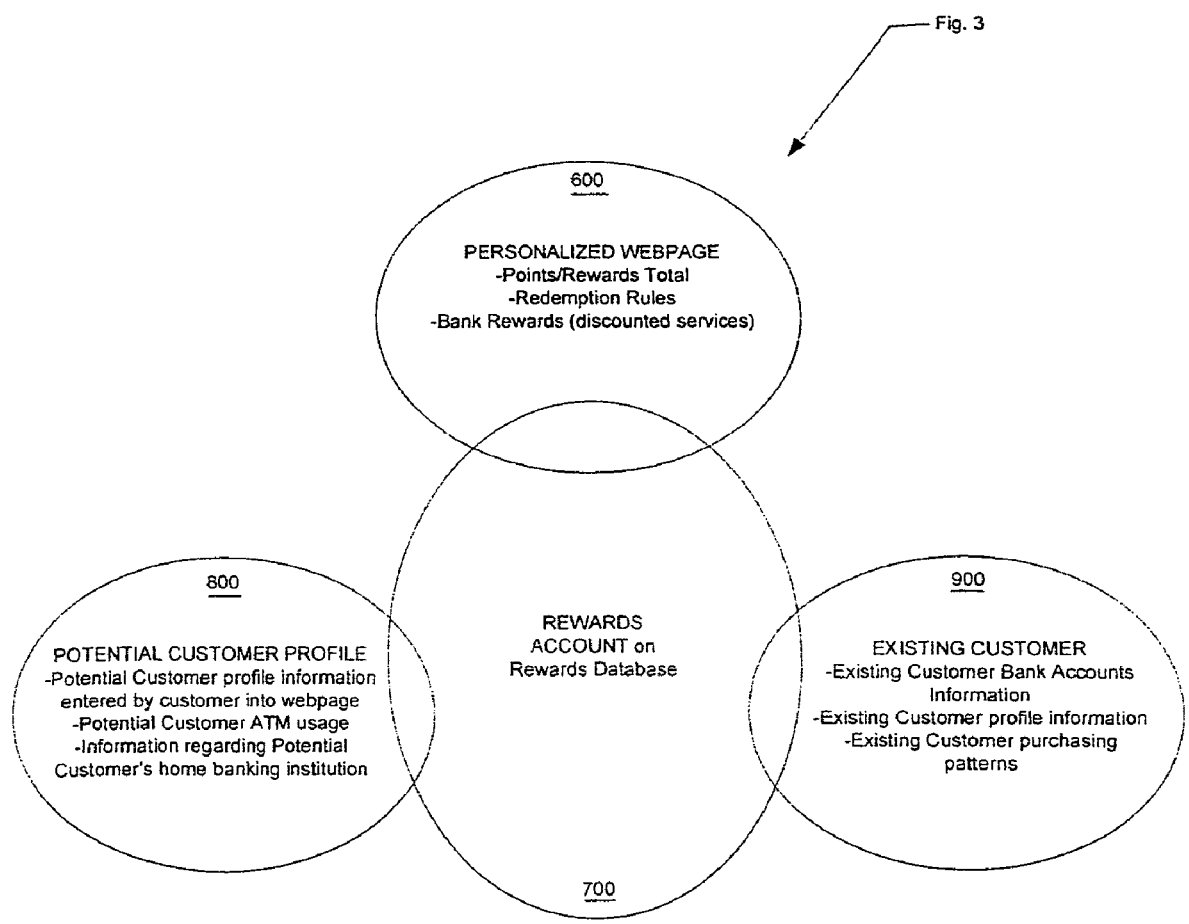
FIG. 3 is a block diagram, illustrating the interaction between a rewards database, customer profile information, and a personalized web page, in accordance with some embodiments of the present invention.

As noted above, the rewards may involve, impact, or encourage other services or accounts that the customer may or may not have at the Bank. In other words, rewards from use of a checking account may result in a reduced mortgage payment one month. Rewards from use of a debit card may result in reduced fees for ATM use. Or, the rewards may be unrelated to financial services. With reference to FIG. 3, a personalized web page 600 may display to the customer information regarding the customer's rewards account from a rewards database 700. For potential customers the personalized web page 600 may also display information from the potential customer's profile 800, such as the potential customer's profile information entered by the potential customer into the personalized web page 600, information regarding the potential customer's use of the Banks services (e.g., ATM service), and information regarding the potential customer's home banking institution, including without limitation the home banking institution's goods, products, services, rates, physical locations, etc. For existing customers, the personalized web page 600 may also display information from the existing customer's profile information 900. The existing customer's profile information 900 may include, without limitation, the existing customer's biographical information known by the Bank, information regarding the existing customer's accounts at the Bank, including without limitation, the existence or lack of existence of all of the aforementioned triggering behaviors.

Both existing and potential customers may have a rewards account maintained on a rewards database 700. This database 700 may also have access to both potential and existing customer profiles 800, 900 in order to provide and tailor rewards and reward redemption rules. The rewards database 700 may also have access to the personalized web page 600, so that any redemption, alterations, or accrual of the potential or existing customer's rewards done via the personalized web page 600 may be recorded in the rewards database 700.

It is the intertwined web of Bank services and awards that may be particularly beneficial to the Bank. The rewards may be contoured to encourage particular customer action (e.g., maintaining funds in a money market account or to use the Bank's ATMs), or simply to reward the customer for using Bank services (e.g., frequent flyer miles, redeemable points). In this manner, the Bank may cross promote its products while also increasing the satisfaction level of the customer.

The embodiments of the present invention are not to be limited in scope by the specific embodiments described herein. For example, although many of the embodiments disclosed herein have been described with reference to banks and credit card purchases, the principles herein are equally applicable to any reward account managed by any entity and any customer behavior.

Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although some embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes.

Accordingly, the claims set forth below should be construed in view of the full breadth and spirit of the embodiments of the present inventions as disclosed herein.

What is claimed is:

1. A method of operating a promotional program for users of at least one automated teller machine (ATM) of a banking institution, wherein the method comprises:
   receiving a device from the user at the at least one ATM;
   determining, using a computer processor, whether the user is an existing customer or a potential customer of the banking institution, wherein the existing customer is a present account-holder with the banking institution and the potential customer is not a present account-holder with the banking institution;
   accessing, using a computer processor, an existing customer transaction history if the user is an existing customer, wherein the existing customer interaction history comprises the user's: (1) transaction history with the at least one ATM of the banking institution, (2) transaction history with the banking institution, and (3) transaction history with third parties;
   accessing, using a computer processor, a potential customer transaction history if the user is a potential customer, wherein the potential customer transaction history comprises the user's history of transactions with the at least one ATM of the banking institution, wherein the potential customer transaction history is identified by at least one identifier associated with the user; and
   dispensing a receipt with a symbol or picture thereon redeemable for a prize wherein the symbol or picture is printed or stamped or affixed on the receipt in a random location on the receipt;

wherein the dispensing of the receipt is accomplished through the use of the ATM;

wherein the at least one ATM machine dispenses the receipt after successful completion of a transaction and wherein the indicia is randomly dispensed to users meeting pre-determined criteria, and wherein completion of the transaction is determined from the existing customer transaction history or the potential customer transaction history; and wherein the symbol or picture is directly redeemable for the prize with no additional steps or requirements placed upon the user to redeem the symbol or picture beyond presenting the symbol or picture in the manner indicated on the receipt.

2. The method of operating a promotional program of claim 1, wherein the symbol or picture is printed or stamped or affixed in a pre-determined location on the receipt dispensed from the ATM.

3. The method of operating a promotional program of claim 2, wherein the symbol or picture is a printed or stamped or affixed on paper to be used as a receipt before the transaction.

4. The method of operating a promotional program of claim 2, wherein the symbol or picture is printed or stamped or affixed on paper to be used as a receipt during the transaction.

5. The method of operating a promotional program of claim 1, wherein the receipt with a symbol or picture is irregularly dispensed.

6. The method of operating a promotional program of claim 1, wherein the symbol or picture is irregularly printed or stamped or affixed.

7. The method of operating a promotional program of claim 1, wherein the symbol or picture is randomly printed or stamped or affixed.

8. The method of operating a promotional program of claim 1, wherein the symbol or picture is representative of a particular prize.

9. The method of operating a promotional program of claim 8, wherein the prize is tickets to a sporting event, concert, special events, play, or cultural event.

10. The method of operating a promotional program of claim 8, wherein the picture or symbol is a tennis ball and the prize is tickets to a tennis tournament.

11. The method of operating a promotional program of claim 8, wherein the symbol or picture is a soccer ball, and the prize is tickets to a soccer tournament or game.

12. The method of operating a promotional program of claim 8, wherein the symbol or picture is a football, and the prize is tickets to a football game.

13. The method of operating a promotional program of claim 1, further comprising the step of:

redeeming the ATM receipt with the symbol or picture thereon for the prize.

14. The method of operating a promotional program of claim 13, further comprising the step of:

verifying the authenticity of the ATM receipt with the symbol or picture thereon.

15. The method of operating a promotional program of claim 14, wherein the step of verifying the authenticity of the ATM receipt with the symbol or picture thereon utilizes thermal signature technology, watermarks, scrambled indicia technology, or a checksum.

16. The method of operating a promotional program of claim 14, wherein the step of verifying the authenticity of the ATM receipt with the symbol or picture thereon is comprised of verifying that records maintained by the ATM or the banking institution match information contained on the ATM receipt.

17. A method of operating a promotional program for users of at least one automated teller machine (AM) of a banking institution, wherein the method comprises:

receiving a device from the user at the at least one ATM;

determining, using a computer processor, whether the user is an existing customer or a potential customer of the banking institution, wherein the existing customer is a present account-holder with the banking institution and the potential customer is not a present account-holder with the banking institution;

accessing, using a computer processor, an existing customer transaction history if the user is an existing customer, wherein the existing customer interaction history comprises the user's: (1) transaction history with the at least one ATM of the banking institution, (2) transaction history with the banking institution, and (3) transaction history with third parties;

accessing, using a computer processor, a potential customer transaction history if the user is a potential customer, wherein the potential customer transaction history comprises the user's history of transactions with the at least one ATM of the banking institution, wherein the potential customer transaction history is identified by at least one identifier associated with the user;

irregularly dispensing a receipt with a symbol or picture printed, stamped, or affixed thereon wherein the symbol or picture is printed or stamped or affixed on the receipt in a random location on the receipt;

wherein the receipt with such symbol or picture is redeemable for tickets to a sporting event, concert, special event, play, or cultural event;

wherein the dispensing of the receipt is accomplished through the use of the at least one ATM; and wherein the at least one ATM machine dispenses the receipt after successful completion of a transaction and wherein the receipt is irregularly dispensed to users meeting pre-determined criteria, and wherein completion of the transaction is determined from the existing customer transaction history or the potential customer transaction history;

verifying the authenticity of the receipt with the symbol or picture thereon; and wherein the symbol or picture is directly redeemable for the tickets with no additional steps or requirements placed upon the user to redeem the symbol or picture beyond presenting the symbol or picture in the manner indicated on the receipt.

18. A method of operating a promotional program for users of at least one automated teller machine (ATM) of a banking institution, wherein the method comprises:

receiving a device from the user at the at least one ATM;

determining, using a computer processor, whether the user is an existing customer or a potential customer of the banking institution, wherein the existing customer is a present account-holder with the banking institution and the potential customer is not a present account-holder with the banking institution;

accessing, using a computer processor, an existing customer transaction history if the user is an existing customer, wherein the existing customer interaction history comprises the user's: (1) transaction history with the at least one ATM of the banking institution, (2) transaction history with the banking institution, and (3) transaction history with third parties;

accessing, using a computer processor, a potential customer transaction history if the user is a potential customer, wherein the potential customer transaction history comprises the user's history of transactions with the at least one ATM of the banking institution, wherein the potential customer transaction history is identified by at least one identifier associated with the user; and dispensing a receipt, after successful completion of a transaction, with a symbol or picture thereon redeemable for a prize wherein the symbol or picture is printed or stamped or affixed on the receipt in a random location on the receipt and the dispensing of the receipt is accomplished through the use of the at least one ATM, and wherein further the receipt with a symbol or picture is randomly dispensed to customers meeting pre-determined criteria, and wherein completion of the transaction is determined from the existing customer transaction history or the potential customer transaction history;

wherein the symbol or picture is representative of a particular prize, the particular prize comprising one or more of: tickets to a sporting event, concert, special events, play, or cultural event;

redeeming the ATM receipt with the symbol or picture thereon for the prize, wherein the symbol or picture is directly redeemable for the prize with no additional steps or requirements placed upon the user to redeem the symbol or picture beyond presenting the symbol or picture in the manner indicated on the receipt;

verifying the authenticity of the ATM receipt with the symbol or picture thereon, wherein the verification comprises one or more of: utilizing thermal signature technology, watermarks, scrambled indicia technology, a checksum, verifying that records maintained by the at least one ATM or the banking institution.

* * * * *